United States Patent [19]

Takahashi

[11] Patent Number: 5,361,327
[45] Date of Patent: Nov. 1, 1994

[54] WAVEFORM EQUALIZER APPARATUS FORMED OF NEURAL NETWORK, AND METHOD OF DESIGNING SAME

[75] Inventor: Susumu Takahashi, Tokyo, Japan

[73] Assignee: Victor Company of Japan, Ltd., Yokohama, Japan

[21] Appl. No.: 828,825

[22] Filed: Jan. 31, 1992

[30] Foreign Application Priority Data

Jan. 31, 1991 [JP] Japan .................................. 3-31952

[51] Int. Cl.⁵ ............................................. G06F 15/18
[52] U.S. Cl. ....................................... 395/22; 395/909
[58] Field of Search ............................ 395/22, 24, 909

[56] References Cited

FOREIGN PATENT DOCUMENTS 0491301  6/1992  European Pat. Off. .

OTHER PUBLICATIONS

Application of Multilayer Perceptons as Adaptive Channel Equalisers; IFAC Adaptive Systems in Control and Signal Processing; Gibson et al; 19–21 Apr. 1989; pp. 573–578.
Adaptive Equalization of Finite Non-Linear Channels Using Multilayer Perceptons; Signal Processing 20 (1990) 107–119; Elsevier Science Pub.; Gibson et al; Jun. 1990; pp. 107–119.
Parallel Recursive Prediction Error Algorithm for Training Layered Neural Networks; Int. J. Control; Chen et al; Jun. 1990; vol 51, No 6; pp. 1215–1228.
Neural Nets Filters: Integrated Coding and Signaling in Communication Systems; Proc. Mediterranean Electrotechnical Conference (Melecon 89); SantaMaria et al; 11–13 Apr. 1989; pp. 532–535.
The Neural Net Based Adaptive Equalizer; Proc. of the Iasted Inter. Sym. Artificial Intelligence Application and Neural Networks–AINN 90; Tasic et al; 25–27 Jun. 1990; pp. 69–72.
Equalizing Using Neural Networks; Jha et al; First IEE Inter. Conference on Artificial Neural Networks; 16–18 Oct. 1989; pp. 356–360.
Decision Feedback Equalization Using Neural Network Structures; Siu et al; First IEE Inter. Conf. on Artificial Neural Networks; 16–18 Oct. 1989; pp. 125–128.
Combining Linear Equalization and Self-Organizing Adaptation in Dynamic Discrete-Signal Detection; Kohonen et al; 1990 Inter. Jt. Conf. on Neural Networks–IJCNN; 17–21 Jun. 1990; pp. I-223 to I-228.
Adaptive Channel Equalization Using a Polynomial–Perceptron Structure; Chen et al; IEE Proc. I (Communications, Speech and Vision); vol. 137, No. 5; Oct. 1990; pp.257–264.
Decision Feedback Equalization Using Neural Network Structures and Performance Comparison with Standard Architecture; Siu et al; IEE Proc. I (Communications, Speech and Vision); vol. 137, No. 4; Aug. 1990; pp. 221–225.
The Application of Nonlinear Architectures to Adaptive Channel Equalization; Gibson et al; IEEE Inter. Conf. on Communications; 16–19 Apr. 1990; pp. 649–653.

(List continued on next page.)

Primary Examiner—Allen R. MacDonald
Attorney, Agent, or Firm—Lowe, Price, LeBlanc & Becker

[57] ABSTRACT

A waveform equalizer for reducing distortion of a digital signal produced from a digital data recording and playback system or transmission system is formed of a neural network having fixed weighting coefficients. Respective values for the coefficients are established by generating a corresponding simulated neuron network, by software implementation using a computer, and by executing a neuron network learning operation using input values obtained from a distorted digital signal and teaching values obtained from an original digital signal which resulted in the distorted digital signal.

10 Claims, 17 Drawing Sheets

OTHER PUBLICATIONS

Adaptive Receivers for Removing Linear and Non-Linear Intersymbol Interference by Mean of Time Delay Neural Nets (AR-TDNN); Garcia-Gomez et al; ICASSP-89 Inter. Conf. on Acoustics, Speech and Signal Processing; 23-26 May 1989; pp. 2368-2371.

Artificial Neural Network and Conventional Approaches to Filtering and Pattern Recognition; Grant; Electronics & Communication Engineering Journal; Sep./Oct. 1989; pp. 225-232.

Wright "Neural Networks Tackle Real-World Problems" END Electrical Design News, vol. 35, No. 23, Nov. 8, 1990, pp. 79-90.

Ungerboeck "Nonlinear Equalization of Binary Signals in Gaussian Noise" IEEE Transactions on Communication Technology, vol 19, No. 6, Dec. 1971, pp. 1128-1137.

Bloomer "A Preprogrammed Artificial Neural Network Architecture in Signal Processing" IEEE 1990 Custom Integrated Circuits Conference, May 1990, pp. 26.5.1-26.5.3.

Gibson "Multilayer Perception Structures Applied to Adaptive Equalizers for Data Communications" 1989 International Conference on Acoustics, Speech and Signal Processing, 23-26 May 1989, pp. 1183-1186.

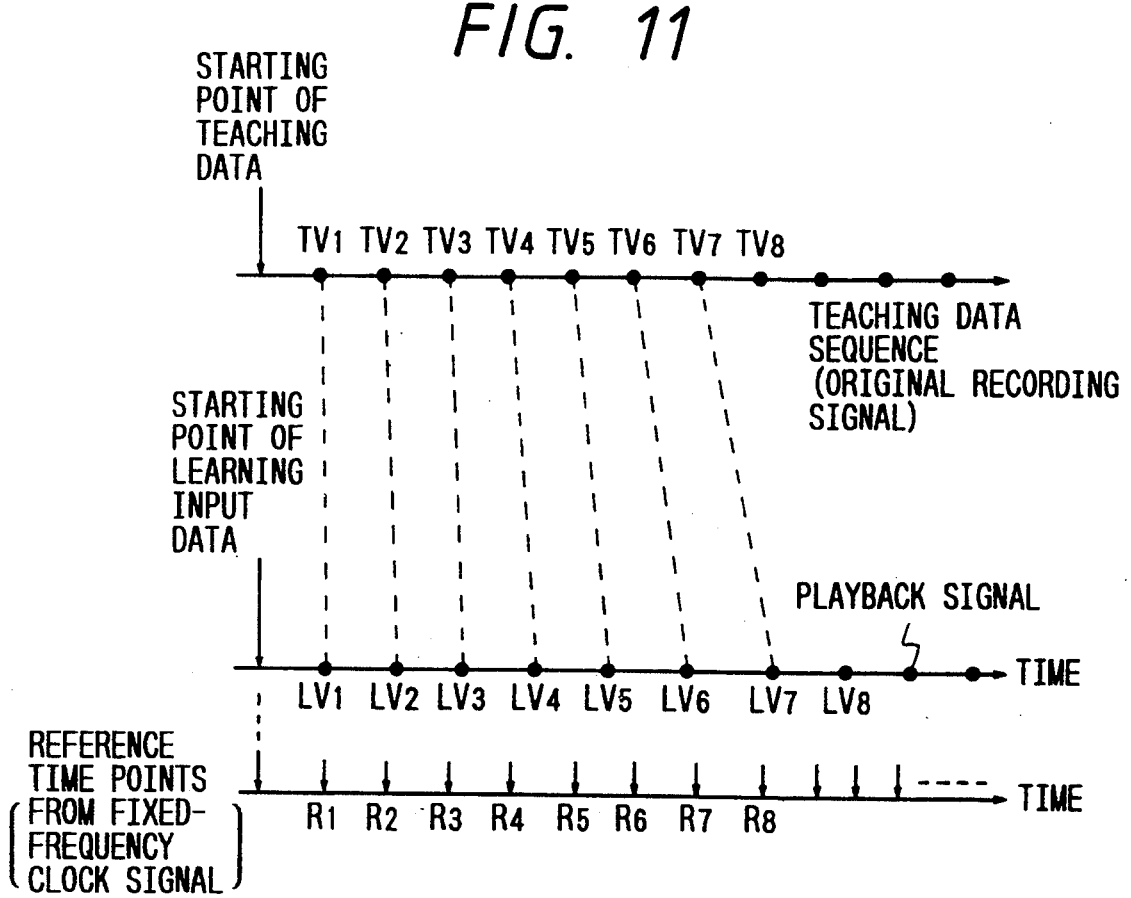
FIG. 11
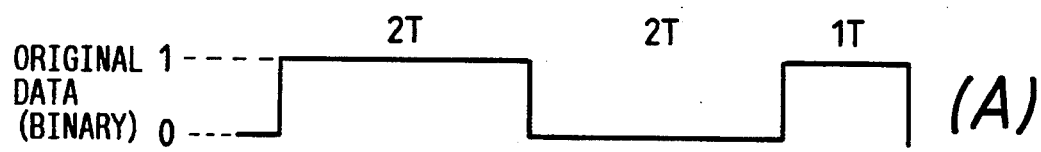
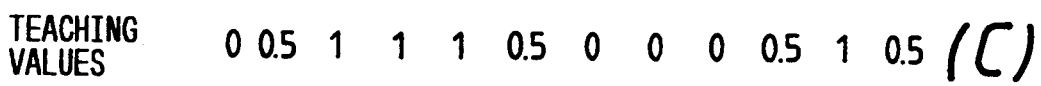
FIG. 12

WAVEFORM EQUALIZATION USING PREFERRED EMBODIMENT OF PRESENT INVENTION

WAVEFORM EQUALIZATION USING PRIOR ART EQUALIZER EXAMPLE

NO WAVEFORM EQUALIZATION

WAVEFORM EQUALIZER APPARATUS FORMED OF NEURAL NETWORK, AND METHOD OF DESIGNING SAME

BACKGROUND OF THE INVENTION

1. Field of the Invention

The present invention relates to a waveform equalizer for removing signal distortion which arises when a digital signal is recorded and subsequently reproduced, or is transmitted and subsequently received, and to a method of designing such a waveform equalizer. In particular, the invention relates to a waveform equalizer which is formed as a neural network having fixed weighting coefficients.

2. Description of the Related Art

In recent years, systems which utilize recording and playback or transmission/receiving of digital signals have come to be widely utilized. However in such a system, even if an original digital signal which is recorded or transmitted has a substantially ideal digital waveform, the resultant signal that is subsequently produced from a playback apparatus or a receiving apparatus will have a waveform that is very different from such an ideal digital signal waveform, and must be regarded as an analog signal for the purposes of signal processing. The following description will be directed to a digital signal recording and playback system, however similar considerations apply to a digital signal transmission and receiving system. The general term "digital signal transfer system" as used in the following description and in the appended claims is intended to designate a system such as a magnetic or optical recording and playback system, or a digital signal transmission system, in which an original signal is recorded and reproduced to obtain a corresponding distorted digital signal, or is transmitted and received, to obtain a corresponding distorted digital signal.

In the specific case of a digital data magnetic recording and playback system, a phenomenon known as "peak shift" occurs whereby portions of the playback digital signal waveform are shifted in time with respect to other portions of the waveform, as a result of the recording and playback process, thereby causing distortion of the signal and resulting in errors in judging the 0 and 1 logic level states of the playback signal data. In the case of an optical recording and playback system too, signal distortion (intersymbolic interference) arises due to such factors as lens aberration, etc. as described in detail hereinafter.

To overcome such problems, a type of waveform equalizer has been used in the prior art which is based on a transversal filter, as illustrated in the circuit diagram of FIG. 1. The waveform equalizer is assumed to receive as input signal a distorted digital signal produced from a recording and playback system. The output signal from the playback apparatus is delayed by successive identical amounts in delay lines 130a to 130d respectively. The directly supplied input signal and the delayed input signal outputs produced from the delay lines are amplified by amplifiers 131a to 131d respectively, which have predetermined respectively different amplification factors. The resultant amplified output signals are then summed by the adder circuit 132, to obtain a waveform-equalized output signal. However such a waveform equalizer apparatus does not provide satisfactory results.

The digital signal distortion which arises in a magnetic recording and playback system will be described in the following. Diagrams (A) to (E) of FIG. 2 are waveform diagrams for illustrating how such distortion occurs in a magnetic recording and playback system. It is assumed here that NRZ (Non Return to Zero) code is recorded and played back, and that the original recording current signal has an ideal digital waveform, i.e. with rapid transitions between fixed 0 and 1 state digital levels as illustrated in diagram (A). However the magnetic pattern that is actually recorded will be of the form shown in diagram (B). At the time of playback, assuming that such an ideal current waveform has been recorded, then since during playback (if there were no distortion in the record/playback process) the waveform of the output signal from the playback apparatus is differentiated, the resultant waveform would be as shown in diagram (C) of FIG. 2. In this case there is no waveform distortion, and no peak shift has occurred.

However in practice, as shown in diagram (D) of FIG. 2, the playback signal that is actually obtained in this case will be substantially distorted. When such a playback signal is differentiated, then it is found an amount of peak shift such as the amount $\Delta t$ has occurred in the differentiated waveform, as shown in diagram (E). Here, a peak value in the differentiated playback signal which should correspond to a recording signal level transition at point t2 of the original recording signal has been displaced. That is to say, for some portions of the playback signal waveform, peak values of the differentiated playback signal will be time-displaced from the correct positions of these peak values. In the NRZ code, one bit is represented by a magnetic polarity inversion. However as a result of such distortion, the positions of inversions of the playback signal waveform will not be clear, so that satisfactory waveform reproduction cannot be achieved. That is to say, although polarity inversions have occurred at the time points t2 and t3, it will be judged (by a circuit which converts the differentiated playback signal of diagram (E) to a data stream) that magnetic polarity inversions have occurred at the time points t1 and t4, or (due to the fact that the signal level at these portions is low) it may be judged that no polarity inversions have occurred in the region from t1 to t4. Conversely, it may be erroneously judged that polarity inversions have occurred at some low-amplitude portions of the playback signal, for example it may be mistakenly judged that inversion has occurred at the time points t5 or t7.

Moreover in the case of an optical type of recording and playback apparatus, even greater degrees of signal distortion can arise. In an optical recording and playback system, defocussing or lens aberration may occur in the optical system of an optical pickup which focusses a small spot of light on the optical disk, and this is a source of overall signal distortion (intersymbolic interference). There are 5 basic types of aberration, and of these, astigmatism, spherical aberration, and coma aberration will result in distortion and intersymbolic interference in the digital signal. In addition, optical aberration can arise as a result of an optical disk being tilted, and this can also result in intersymbolic interference.

Diagrams (A) to (D) of FIG. 3 illustrate how signal distortion can arise in an optical recording and playback system. Here, Tmin designates a minimum duration for which the recorded data remains continuously at the digital 1 or 0 state. In a standard audio signal CD (compact disk) digital recording/playback system, the data that are actually recorded on the disk (i.e. as elongated surface pits, of varying length) represent data that are referred to as "channel bits", which are synchronized with a clock signal known as the channel clock signal, having a frequency of approximately 4.32 MHz. In the field of CD techology the period of that channel clock signal is commonly referred to simply as T, and that designation will be used in the following. The minimum interval between successive inversions of that recorded data will be designated as Tmin. In standard CD operation, the value of Tmin is three periods of the channel clock signal, i.e. 3 T, as illustrated by FIG. 4. However for the purposes of obtaining suitably distorted digital signals to be used in a neural network learning operation as described hereinafter, CDs may be utilized in which the recorded data has a value of Tmin that is less than 3 T.

In diagram (B) of FIG. 3, t1, t2, t3 and t4 denote respective time points which are defined by a the aforementioned channel clock signal. Looking first at the waveform of diagram (A), the data inversion point X in the original data, which occurs at a time point t2, is preceded by 1 Tmin period at the digital 0 state, and succeeded by 3 Tmin periods at the digital 1 state. Conversely, the data inversion point Y is preceded by 3 Tmin periods at the digital 1 state and is succeeded by one Tmin period at the digital 0 state.

Playback of an optical disk is based upon energy, and such playback operation does not include elements which are of mutually opposite kind, such as the N and S polarities of a magnetic recording and playback system. For that reason, when a lack of sharpness due to spherical aberration in the optical system arises, then as shown in diagram (B) of FIG. 3, the ends of the long code portion (3 Tmin of data) will become lengthened so that the portion of the waveform at time point t2 is shifted towards the time point t1 and the portion of the waveform at t3 is shifted towards t4. In addition, the distortion that results from coma aberration can cause even more serious effects. Diagram (C) of FIG. 3 shows a case in which coma aberration is produced which is oriented in the opposite direction to the direction of disk rotation, while diagram (D) shows a case in which coma aberration is produced which is oriented along the direction of disk rotation. It can be seen that the amount and shape of the waveform distortion of the playback signal will differ in accordance with these two types of coma aberration.

When reading data from an optical recording and playback system, e.g. from an optical disk (referred to in the following simply as a CD), there will generally be high levels of these different types of aberration in the lens and the optical system, and it is not possible to quantitatively determine the respective amounts of distortion that arise from the various types of aberration. Thus it has been almost impossible to achieve effective waveform equalization in the prior art. Taking for example the prior art waveform equalizer shown in FIG. 1, respectively different coefficient values would be required, i.e. different values of amplification factors for the amplifiers 131a to 131e, depending upon the degree of intersymbolic interference (i.e. degree of code distortion) and the causes of the distortion. Thus the coefficient values cannot be unconditionally defined, so that it has not been possible to achieve satisfactory results with the such prior art types of waveform equalizer, which have linear input/output characteristics.

In the case of the signal distortion conditions which arise in a magnetic recording and playback system, as illustrated in diagrams (D) and (E) of FIG. 2, it would be possible for an individual who is highly experienced in the characteristics of a magnetic recording and playback system and the NRZ code to make correct judgements concerning the playback signal, by examining such a static waveform diagram. That is to say, the polarity inversions always occur in pairs, so that each positive-going inversion of the playback signal should always be followed by a negative-going inversion, i.e. there should be a sequence of positive-negative, positive-negative, inversions. Hence, considering the time points t2 and t3, it can be judged that inversions occur in that portion of the waveform of diagram (D) of FIG. 2 within a short time interval, and since the period has been lengthened as a result of bit shifting in that portion, the inversion points could be correctly judged as being at the time points t2, t3, rather than at the points t1, t4 (which erroneous judgement might be made based on the results of differentiation, shown in diagram (E)). Similarly, since the playback signal waveform is positive at each of the time points t5, t6 and t7, i.e. positive-negative inversion pairs do not appear, it would be judged by an experienced individual that t6 is a data inversion point.

Furthermore, in the case of the signal distortion conditions in an optical recording and playback system that are illustrated in diagrams (B) to (D) of FIG. 3, it would be possible for an experienced individual who is very familiar with the characteristics of such an optical recording and playback system to make correct judgements of the playback signal waveform. Specifically, from the slope of the 3 Tmin data portion extending betweeen t2 and t4, it would be possible for such an individual to estimate the direction and the amount of coma aberration, and based on that knowledge, to correctly judge the transition points (t2, t3) of the playback signal.

However it is not practicable to execute real-time elimination of signal distortion that arises in a digital signal recording and playback system or transmission system, by a method which uses human experience and analysis as described above. Prior art types of waveform equalizer cannot provide satisfactory performance, and in addition the design of such a waveform equalizer (for example, to determine the amplification factors in accordance with the characteristics of a particular recording and playback system) is complex.

Recently, signal processing by neural networks has been proposed in various types of applications. A neural network consists of a plurality of neuron units, each having a non-linear input/output characteristic, and interconnected by linking elements which have respective mutually independent weighting coefficients. The weighting coefficients can be altered by a learning operation, which involves comparing an output value produced from the neural network (while a specific combination of input values are being inputted to the neural network) with a desired value (referred to as a teaching value), and modifying the values of the weighting coefficients such as to bring the output value from the neural network closer to the teaching value, by using a learning algorithm. The learning process is successively repeated for a number of different teaching values and corresponding input value combinations. The operation of a neural network is generally implemented by simulation using a computer. As a result, it has not been possible to achieve a sufficiently high performance with a neural network (due to the limited processing speed capabilities of the usual types of computer) to execute real-time signal processing for such a waveform equalizer type of application. Moreover, it is difficult to realize neuron units as practical hardware circuits which have non-linear input/output characteristics.

Due to the above factors, it has not been considered practicable to use a neural network to learn the characteristics of a magnetic recording and playback system or an optical recording and playback system and to thereby execute real-time equalization of a distorted digital signal that is produced from a transmission or playback system.

SUMMARY OF THE INVENTION

It is an objective of the present invention to overcome the disadvantages of the prior art as set out above, by providing a waveform equalizer having a simple circuit configuration, which can be easily designed to match the specific characteristics of a particular recording and playback system or transmission/receiving system, and which provides greater accuracy of waveform equalization than has been possible in the prior art.

With the present invention, a waveform equalizer is configured as a neural network circuit formed of a plurality of circuit units functioning as neuron units each having a non-linear input/output characteristic, which are interconnected by linking elements having fixed, respectively independently established weighting coefficients. These weighting coefficients are established beforehand by generating a simulated neural network having variable weighting coefficients, whose configuration is equivalent to that of the waveform equalizer neural network, by means of a suitably programmed computer. While inputting successive values of a distorted digital signal to the simulated neural network and comparing the resultant output values produced from that simulated neural network with desired (i.e. original, undistorted) digital signal values, the weighting coefficients of the simulated neural network are successively varied until suitable values are obtained, by using a known type of learning algorithm such as a back-propogation algorithm which operates on the basis of results obtained from the aforementioned comparisons. The weighting coefficients which are obtained as final values (at the end of the neural network learning processing) are then used to determine respective values for the corresponding fixed weighting coefficients for the neural network of the actual waveform equalizer circuit, for example to determine the respective values of resistors which are used as linking elements providing fixed weighting coefficients.

As a result, the learning function and the actual signal processing function can be optimally executed mutually separately, enabling a waveform equalizer to be provided which performs effective real-time equalization of a distorted digital signal produced from a playback system or transmission system.

The finally obtained waveform equalizer (formed as a neural network, with fixed weighting coefficients) can be implemented by a hardware circuit configuration that is based on generally available types of analog components such as operational amplifiers, diodes and resistors.

During the actual waveform equalization signal processing, the learning function is of course unnecessary, so that the waveform equalizer configuration can be simple, and high-speed processing can be achieved.

More specifically, according to a first aspect the present invention provides a waveform equalizer for processing an input distorted digital signal, comprising:

delay means coupled to receive the input distorted digital signal, for delaying the distorted digital signal by successive fixed amounts to obtain a plurality of delayed distorted digital signals; and a plurality of neuron units, and a plurality of linking elements having respectively fixed weighting coefficients, the linking elements interconnecting the neuron units to form a neural network which is coupled to receive the input distorted digital signal and delayed distorted digital signals as input signals thereto, and which produces a waveform-equalized output digital signal in response to the input signals.

Respective values for the fixed weighting coefficients are established by a learning procedure employing a computer-simulated neural network having variable weighting coefficients and having a network configuration corresponding to that of the neural network of the waveform equalizer.

The learning operation includes supplying to the computer-simulated neural network an input distorted digital signal while comparing with an output signal obtained from that neural network a teaching signal which is an undistorted digital signal corresponding to the distorted digital signal, and applying a predetermined learning algorithm to alter the variable weighting coefficients in accordance with differences between the teaching signal and the neural network output signal.

Preferably, a range of values of the aforementioned teaching signal include at least one value that is intermediate between a digital 1 value and a digital 0 value.

The neural network of such a waveform equalizer is preferabley formed of a plurality of layers of neuron units, wherein an output one of the layers receives a plurality of weighted input signals from a preceding one of the layers, and wherein the weighted input signals may include signals of mutually opposite polarity.

Each of the neuron units of the waveform equalizer is configured as a signal conversion unit which executes non-linear conversion of a sum of weighted input signals applied thereto, and each of the conversion units includes at least one semiconductor device, such as a pair of diodes connected with opposing directions of polarity, for providing a non-linear input/output characteristic. Each of the neuron units of the waveform equalizer can thereby be configured to have a non-linear input/output characteristic which is formed of a plurality of respectively different linear regions.

Furthermore, each of the neuron units of such a waveform equalizer preferably comprises a pair of series-connected signal inverting elements, such that of a plurality of weighted input signals supplied to each neuron unit, each of the weighted input signals is selectively supplied to a first one or a second one of the inverting elements in accordance with whether an effectively positive or effectively negative value of weighting coefficient is to be applied to each input signal.

According to another aspect, the present invention provides a method of designing a waveform equalizer for waveform equalization of a a distorted digital signal produced from a digital signal recording and playback apparatus, the waveform equalizer being formed as a neural network comprising a plurality of neuron units which are interconnected by linking elements providing respective fixed weighting coefficients, wherein respective values for the fixed weighting coefficients are mutually independently established by:

generating a set of original data, and storing the original data in a first memory means;

recording the original data as digital data values on a recording medium, and subsequently executing playback of the recorded original data, to obtain a playback digital signal;

periodically sampling the playback digital signal with a sampling period that is less than or equal to a data period of the digital data values, to obtain successive digital sample values to be used as learning input values, and storing the learning input values in a second memory means;

generating a simulated neural network having variable weighting coefficients, by using a computer, the simulated neural network being an equivalent circuit of the waveform equalizer neural network;

supplying successive ones of the learning input values from the second memory means to the computer to be sequentially inputted to the simulated neural network;

supplying successive data values of the original data, respectively corresponding to the learning input values, from the first memory means to the computer to be used as teaching signal values for comparison with respective output values produced from the simulated neural network;

repetitively executing a learning algorithm utilizing results obtained from the comparison, to successively alter the variable weighting coefficients of the simulated neural network, until a predetermined degree of convergence is obtained for values of the variable weighting coefficients; and establishing respective values for the fixed weighting coefficients of the waveform equalizer neural network, based upon final values obtained for corresponding ones of the variable weighting coefficients of the simulated neural network.

With such a method of designing a waveform equalizer the sampling can be executed utilizing a sampling clock signal generated by a phase locked loop, the phase locked loop being coupled to receive the playback digital signal and functioning to extract a clock signal from the playback digital signal and to generate the sampling clock signal based on the extracted clock signal.

Alternatively, the invention provides a method of designing a waveform equalizer wherein the teaching values are derived by:

dividing the original data into successive discrete digital values respectively corresponding to the sample values;

transferring the discrete digital values through a digital low-pass filter to obtain filtered data values; and obtaining the teaching values by selecting successive ones of the filtered data values by an identical selection operation to the operation for selected the learning input values from the digital sample values.

BRIEF DESCRIPTION OF THE DRAWINGS

FIG. 11 is a timing diagram for illustrating time-axis deviations of learning input values within a playback digital signal used in a neural network learning operation, with respect to corresponding teaching values of an original data signal which was recorded;

FIG. 12 is a timing diagram to illustrate the recording of original data as text data on a floppy disk, and subsequent derivation of teaching values from the text data;

DESCRIPTION OF PREFERRED EMBODIMENTS

Figure 1:
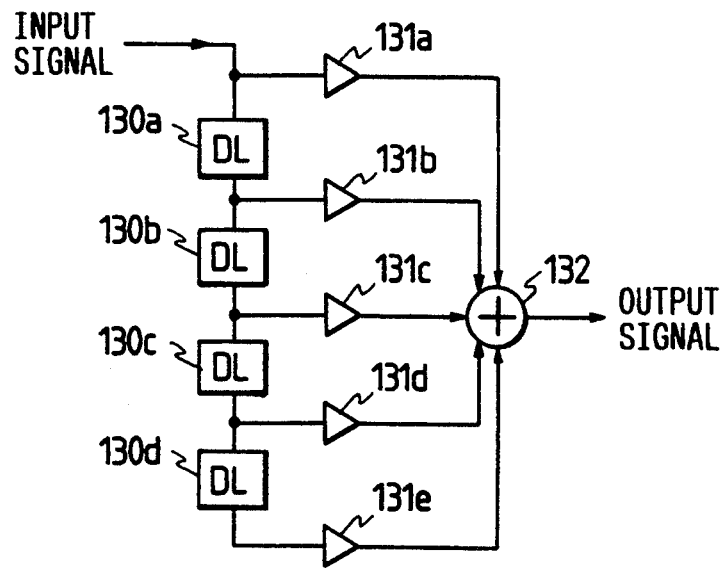
FIG. 1 is a circuit diagram of an example of a prior art digital signal waveform equalizer circuit.
Figure 2:
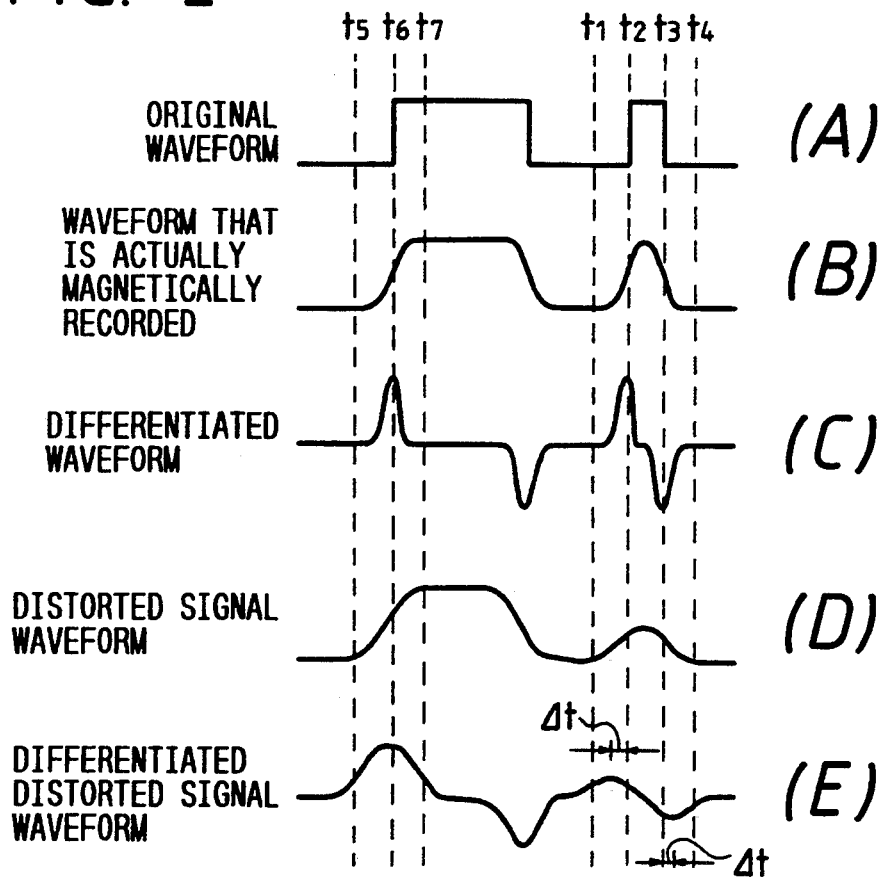
FIG. 2 is a waveform diagram for describing distortion of signals in a magnetic recording and playback system for digital signals.
Figure 3:
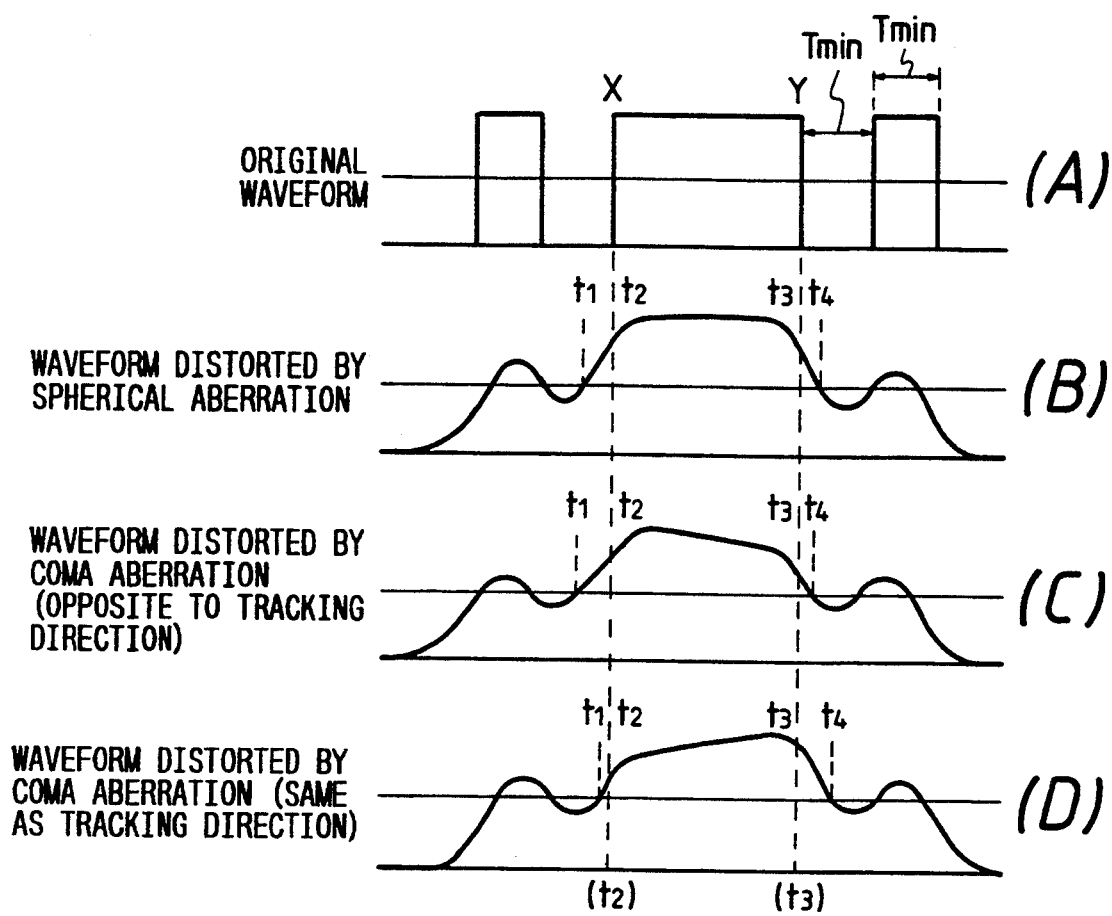
FIG. 3 is a waveform diagram for describing distortion of signals in an optical recording and playback system for digital signals.
Figure 4:
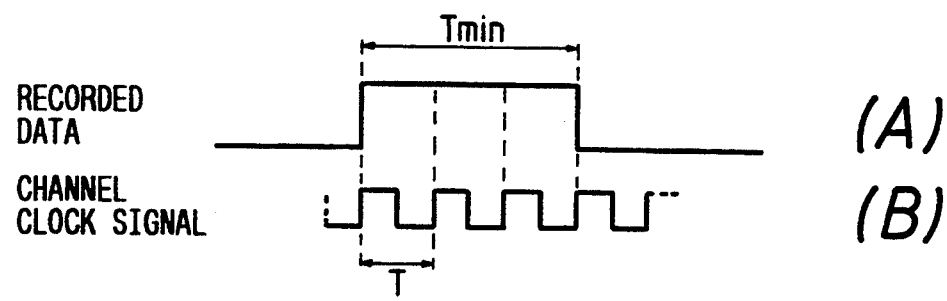
FIG. 4 is a timing diagram for illustrating a minimum bit interval of data recorded on a CD.

An embodiment of a waveform equalizer formed of a neural network according to the present invention and a method of designing and manufacturing such a waveform equalizer will be described in the following referring to the drawings.

Figure 5:
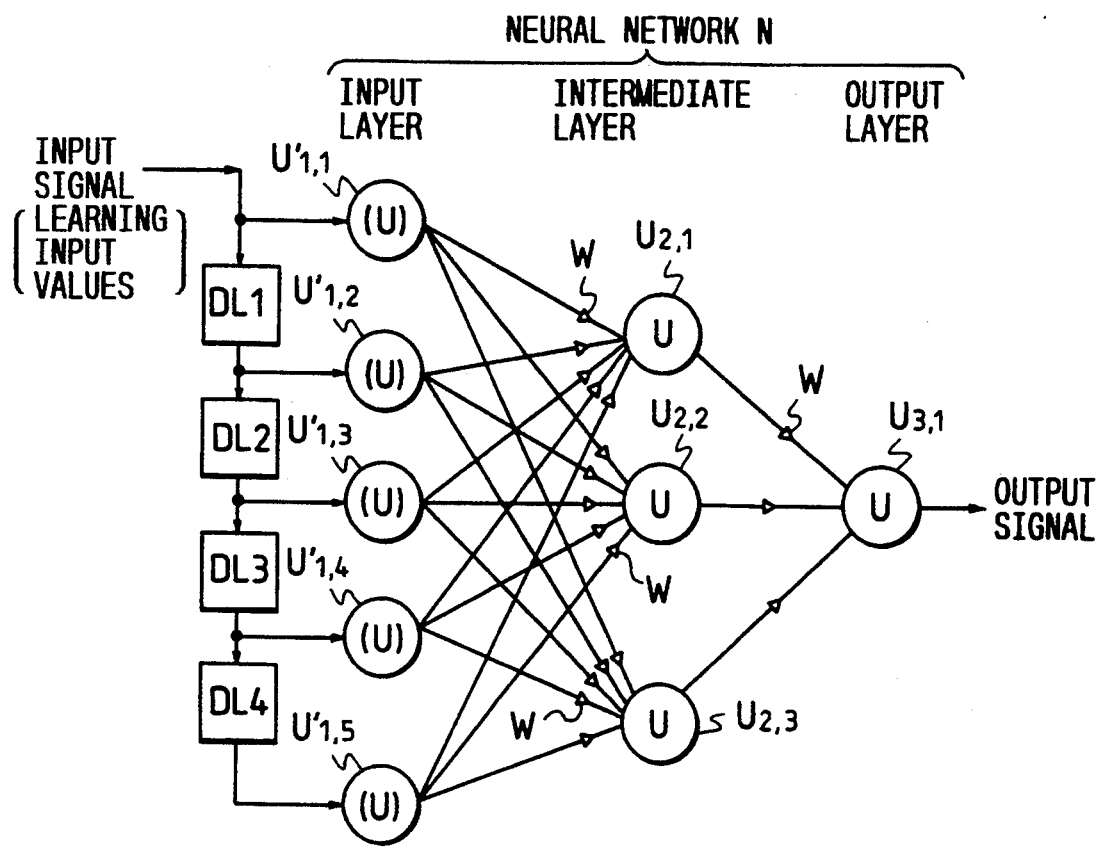
FIG. 5 shows a simulated neural network, used in a learning operation for designing an embodiment of a waveform equalizer according to the present invention.

FIG. 5 shows a neural network which is an equivalent circuit to an embodiment of a waveform equalizer according to the present invention, and which is implemented by simulation using a computer in order to design such a waveform equalizer. This is a multilayer neural network formed of successive layers of neuron units, with interconnections by linking elements which are connected between the neuron units of a layer and neuron units of the preceding and succeeding layers. The neuron units are designated in general as $U_{n,i}$, where "n" and "i" respectively denote the position of the layer containing that neuron unit and the position of the neuron unit within that layer, i.e. with $U_{n,i}$ indicating the $i^{th}$ neuron unit of the $n^{th}$ layer, while $U_{n-1,j}$ designates the $j^{th}$ neuron unit of the $(n-1)^{th}$ layer In FIG. 5, an input signal is supplied to a series-connected set of four delay lines DL1, DL2, DL3, DL4, so that a set of five output signals are obtained. These five output signals correspond to five output signals which are distributed successively along the time axis. However in the simulated neural network, each of these delay lines DL can be considered to be a data register, through which input data values (described hereinafter, and referred to as learning input values) are successively shifted. These five output signals are respectively inputted to a set of units designated as $U'_{1,1}$ to $U'_{1,4}$ which constitute an input layer of the neural network. In this embodiment each of these units of the input layer represents a linear amplifier which serves as an input buffer amplifier in the actual hardware neural network. The output signals from the input layer are coupled to respective ones of a set of neuron units $U_{2,1}$, $U_{2,2}$, $U_{2,3}$ which constitute an intermediate layer of the neural network, with the output signals from the input layer being coupled through the aforementioned linking elements which multiply the output signals by respective weighting coefficients, these weighting coefficients being designated in general as W. Each of the neuron units has a specific non-linear input/output characteristic. In general, each weighting coefficient is designated as $W_{n,i,j}$, which indicates that the weighting coefficient is applied to the output signal from the $j^{th}$ neuron unit of the $(n-1)^{th}$ layer that is supplied to the $i^{th}$ neuron unit of the $n^{th}$ layer. During a neural network learning operation described hereinafter, these weighting coefficients W are variable and are determined mutually independently, however in the neural network of the actual waveform equalizer (i.e. the hardware configuration) the values of the weighting coefficients W are fixed (by respective resistor values). The values of these weighting coefficients W which connect the input layer to the intermediate layer can be considered to represent respective strengths of coupling between neuron units of the intermediate layer and neuron units of the input layer.

In a similar way, respectively output signals produced from the neuron units of the intermediate layer are transferred through linking elements having respective weighting coefficients W to be inputted to a neuron unit of the output layer of the neural network. In this embodiment, the output layer of the neural network consists of only a single neuron unit, that is to say a single output value is produced from that final neuron unit of the neural network in response to a specific combination of input signal values supplied to the input layer of the neural network. That final neuron unit is designated as $U_{3,1}$.

Figure 6:
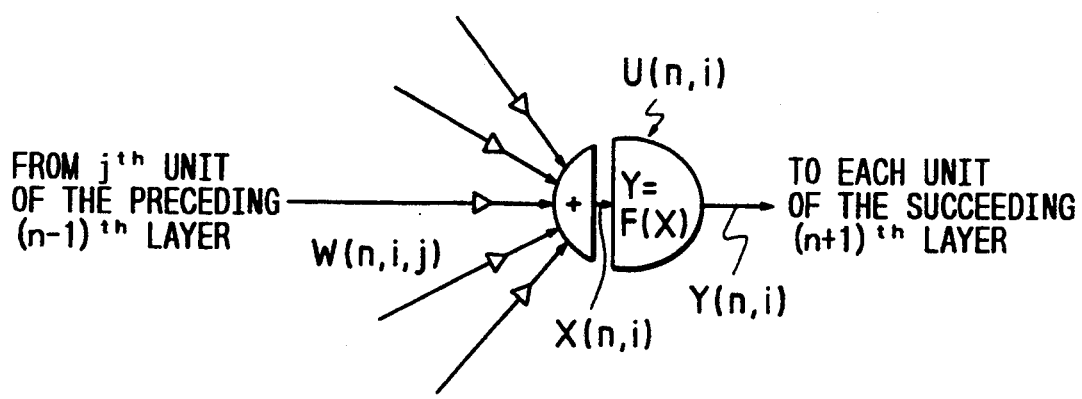
FIG. 6 illustrates the operation of neuron units in the neural network.

As described above, each of the units of the input layer of this embodiment is a linear amplifier. However each of the neuron units of the input layer and output layer has a predetermined non-linear input/output characteristic, whereby the level of output signal produced therefrom varies in a known non-linear manner in accordance with the sum of the weighted input signal values applied thereto, and whereby respective weighting coefficients are selected to be positive or negative. This is illustrated in FIG. 6, which is a conceptual diagram to illustrate the input connections and operation of a neuron unit $U_{n,i}$. Such a neuron unit can be considered to consist of an input section 50 and an output section 51. The input section 50 sums the weighted input signal values supplied thereto, with each of these input signal values having been multiplied by a corresponding weighting coefficient which is designated as $W_{n,i,j}$. The resultant sum output signal that is produced from the input section 50 of the neuron unit is designated as $X_{n,i}$, and is supplied to the output section 51 of the neuron unit. The output section executes processing in accordance with the non-linear function $Y = F(X)$, to obtain the output signal $Y_{n,i}$, which is supplied to one or more neuron units of the succeeding layer after having been multiplied by respective weighting coefficients.

The basic principles of learning operation (i.e. during the computer simulation stage of designing the neural network) can be summarized as follows. A sequence of input signal values and a corresponding sequence of desired output values from the neural network (the latter being referred to as teaching values) are derived beforehand as described hereinafter, and stored in memory. During the learning operation, these input values and teaching values are successively read out from memory, with the input values being supplied to the chain of "delay lines" DL1 to DL4. During each interval after an input value has thus been supplied and prior to supplying the next input value to the delay line chain, a specific combination of output values will be inputted in parallel to the neural network (i.e. in this embodiment, a set of five values), and these simulate a set of input values which are distributed at fixed intervals along the time axis. At that time, a corresponding teaching value is read out from memory, to be compared with the output value produced from the neural network (i.e. from the final neuron unit $U_{3,1}$ in this embodiment). The difference between that teaching value and the output value from the neural network is then applied in a learning algorithm, for modifying the respective values of the weighting coefficients W of the neural network, in a manner such as to reduce the amount of that difference. In this embodiment, the learning operation is executed by using a back-propogation type of learning algorithm, whereby weighting coefficient updating processing proceeds from the output layer back to the input layer, i.e. in the reverse direction to the normal forward direction of processing. Such types of learning algorithm are now well known in the art, so that detailed description will be omitted.

As mentioned above, in the computer-simulated neural network of FIG. 5, the units indicated as DL1 to DL4 would not be actual delay lines, but might be for example a set of four data registers. During the learning operation, each time that a new input signal value is supplied (with a corresponding teaching value also being supplied, to be compared with the new output value that will be produced from the neural network), the contents of DL3 are shifted into DL4, the contents of DL2 are shifted into DL3, the contents of DL1 are shifted into DL32, and the most recent input signal value is set into DL1. Thus, a new combination of five input signal values are being supplied to the input layer of the neural network, and the resultant output value from the neural network is compared with the new teaching value.

Figure 8:
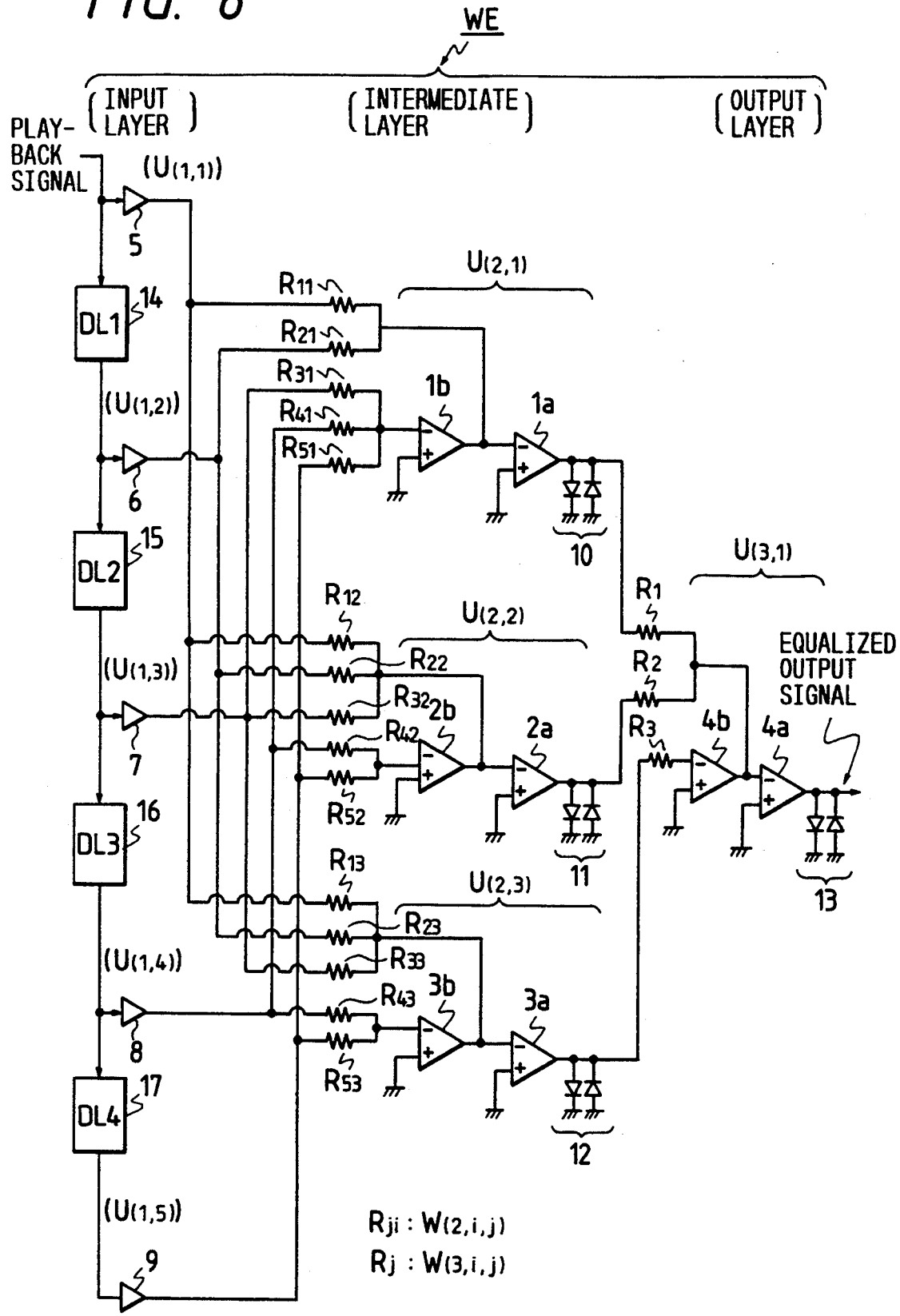
FIG. 8 is a circuit diagram of the embodiment of a waveform equalizer according to the present invention.

FIG. 8 is a basic circuit diagram of this waveform equalizer embodiment. While all of the components shown in FIG. 5 are simulated by computer processing during the learning operation, i.e. implemented by software, the components of the circuit shown in FIG. 8 are generally-available hardware analog circuit elements, such as operational amplifiers, resistors etc. The circuit shown in FIG. 8 is equivalent to the neural network of FIG. 5, but with fixed values for the weighting coefficients W, with these fixed values being determined by by respective values of resistors R1 to R53. These fixed weighting coefficient values are determined beforehand by a neural network learning operation using the computer-simulated neural network of FIG. 5, as described in detail hereinafter.

In FIG. 8, an input signal (i.e. a distorted digital signal which is produced from a recording and playback apparatus after having been recorded and reproduced, or is outputted from a digital signal transmission system after being received) is applied to a chain of four series-connected delay lines 14, 15, 16, 17 which respectively corresponding to the four simulated "delay lines" DL1 to DL4 of the neural network circuit of FIG. 5. That output signal and the respective output signals from the delay lines 14 to 17 are amplified by respective ones of a set of linear amplifiers 5, 6, 7, 8, and 9 which respectively correspond to the amplifiers $U'_{1,1}$ to $U'_{1,5}$ of the input layer of the equivalent neural network circuit of FIG. 5. The output signals produced from the amplifiers 5 to 9 are coupled through the set of resistors R11, R21, R31, R41, R51, R12, R22, R32, R42, R52, R13, R23, R33, R43, and R53 to circuit units which function as the neuron units of the intermediate layer. These circuit units are signal conversion units each of which executes non-linear conversion of an input signal applied thereto. The conversion units of the intermediate layer respectively correspond to the neuron units $U_{2,1}$ to $U_{2,3}$ of the neural network of FIG. 5. In this embodiment, each conversion unit of the intermediate layer is formed of a pair of operational amplifiers connected in series, with a diode pair connected at the output of the second operational amplifier, to provide a non-linear input/output characteristic. Of the weighted input signals that are applied to such a neuron unit, some of the input signals are inputted to the inverting input terminal of the first operational amplifier of the series-connected pair (e.g. to the operational amplifier 1b, in the case of the neuron unit $U_{2,1}$), with the non-inverting input terminal of that operational amplifier being connected to ground potential, while other ones of these weighted input signals are applied to the inverting input terminal of the second one of the pair of series-connected operational amplifiers (e.g. to the operational amplifier 1a, in the case of the neuron unit $U_{2,1}$), with the non-inverting input terminal of that operational amplifier being connected to ground potential. It can thus be understood that each signal that is applied to the first operational amplifier (e.g. to operational amplifier 1b) of such a series-connected pair will be inverted twice in succession, i.e. will in effect not be inverted, whereas each signal which is supplied to the second one (e.g. operational amplifier 1a) of a pair of series-connected operational amplifiers will be inverted. Hence, each input signal that is supplied to the first operational amplifier of the pair can be considered to be multiplied by a fixed positive weighting coefficient (whose value is determined by the value of the resistor through which that signal is transferred), while each input signal that is supplied to the second operational amplifier of such a pair is in effect multiplied by a fixed negative weighting coefficient (whose absolute value is determined by the value of the resistor through which that signal is transferred).

The output terminal of the second operational amplifier of each neuron unit is connected to ground potential through a pair of diodes which are connected in parallel with mutually opposing directions of polarity, i.e. the diode pairs 10, 11 and 12 connected to the outputs of the operational amplifiers 1a, 2a and 3a respectively of the actual neuron units in FIG. 8 which correspond to the neuron units $U_{2,1}$, $U_{2,2}$, $U_{2,3}$ of the neural network circuit of FIG. 5.

The three neuron units of the intermediate layer in FIG. 8 are respectively formed of the series-connected pair of inverting-type operational amplifiers 1a, 1b, with the diode pair 10 connected at the output of operational amplifier 1a, the operational amplifiers 2b, 2a with the diode pair 11 connected at the output of operational amplifier 2a, and the operational amplifiers 3b, 3a with the diode pair 12 connected at the output of operational amplifier 3a.

The output signals produced from the neuron units of the intermediate layer in FIG. 8 are transferred through weighting resistors R1, R2, R3 respectively to the output neuron unit, corresponding to the output layer $U_{3,1}$ of the neural network circuit of FIG. 5. That output neuron unit is made up of series-connected inverting-type operational amplifiers 4b, 4a, with a diode pair 13 connected to the output of the second operational amplifier 4a. The output signal from the neural network is thereby developed across the diode pair 13.

Each of the diode pairs 10 to 13 functions to provide a known form of non-linear input/output characteristic for the corresponding neuron unit. This will be described referring to FIG. 9, which shows the input/output characteristic of such a diode pair. Such a characteristic can be considered to consist of three different linear regions, which are designated as E1, E2 and E3 in FIG. 9. In the regions E1 and E3 the level of signal voltage appearing across the diode pair is substantially constant (i.e. diode clipping occurs), while in the region E2 the output signal Y (i.e. the signal voltage appearing across the diode pair) varies substantially linearly with respect to input signal X. It can thus be understood that each of the neuron units of the actual waveform equalizer formed of a neural network shown in FIG. 8 can be configured from readily available circuit components, can have a simple circuit arrangement, can provide effectively negative or positive values for the weighting coefficients applied to the input signals applied thereto from neuron units of the preceding layer, and can have a known non-linear input/output characteristic that is formed of three linear regions.

Figure 9:
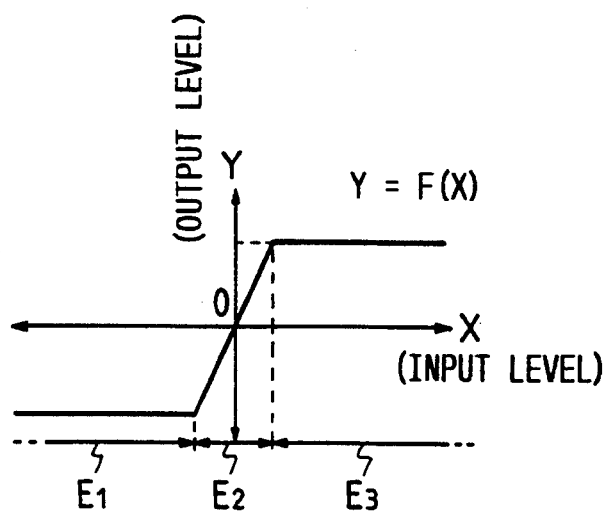
FIG. 9 shows the input/output characteristics of diode pairs used to provide non-linear input/output characteristics in the circuit of FIG. 8.

In FIG. 9, the central potential is assumed to be 0 V, i.e. the output signal Y produced from the output neuron unit varies between fixed positive and negative voltage levels. In the following, these positive and negative levels will be assumed to correspond to the digital 1 and 0 potentials respectively, while in addition the 0 V level of that output signal Y will be taken to represent a level of 0.5, i.e which is midway between the 1 and 0 digital potentials.

The set of resistors (R11, R21, R31, R41, R51, R12, R22, R32, R42, R52, R13, R23, R33, R43, R53) which couple the output signals from the input layer of the neural network circuit in FIG. 8 to the neuron units of the intermediate layer, i.e. which transfer the output signals from the amplifiers 5, 6, 7, 8, 9 to the neuron units $U_{2,1}$, $U_{2,2}$, $U_{2,3}$, will be collectively designated as the resistors $R_{ji}$. These neuron units $U_{2,1}$, $U_{2,2}$, $U_{2,3}$ in FIG. 8 are respectively formed of the pair of (inverting type) operational amplifiers 1a and 1b with the diode pair 10, the pair of operational amplifiers 2a, 2b with the diode pair 11, and the pair of operational amplifiers 3a, 3b with the diode pair 12, The resistors (R1, R2, R3) which couple the output signals from the intermediate layer of the neural network circuit in FIG. 8 to the neuron units of the output layer, i.e. which transfer the output signals from the neuron units $U_{2,1}$, $U_{2,2}$, $U_{2,3}$ to the output neuron unit $U_{3,1}$ will be collectively designated as the resistors $R_j$. The output neuron unit $U_{3,1}$ is formed of pair of operational amplifiers 4a, 4b with the diode pair 13. Thus the weighting coefficients $W_{2,i,j}$ in the neural network of FIG. 5 correspond to the resistors $R_{ji}$ and the weighting coefficients $W_{3,i,j}$ of the neural network of FIG. 5 correspond to the resistors $R_j$.

After respective values for the weighting coefficients W have been established by the learning operation, using computer simulation of the neural network, the respective values for the resistors $R_{ji}$, $R_j$ are determined based upon the values obtained for the corresponding weighting coefficients.

During the learning operation, in the simulated operation of the neural network, successive input signal values (which will be referred to in the following as learning signal values) are successively supplied to the neural network (i.e. to the "delay line" DL1 and the input layer unit $U'_{1,1}$) at intervals which correspond to a fixed (real-time) period. In this embodiment, each of these intervals will be assumed to correspond to one half of the bit period T of the digital playback signal from a CD, i.e. to one half of the minimum bit duration. Thus, in the simulated neural network system, the successive sets of learning input values that are outputted from the "delay lines" DL1 to DL4 are in effect distributed at successive T/2 intervals.

Thus in the actual waveform equalizer circuit of FIG. 8, each of the delay lines 14, 15, 16, 17 (respectively corresponding to the aforementioned "delay lines" DL1 to DL4 which apply input signals to the simulated neural network) provides a delay of T/2 in this embodiment.

The input signal values supplied to the neuron units of the waveform equalizer neural network of FIG. 8 are the weighted output values from the preceding layer, i.e. in the case of the intermediate layer the input values are the output values from the input layer, after these have been respectively weighted by being transferred through the resistors R(j, i) (i.e. R11, R21, R31, R41, R51, R12, R22, R32, R42, R52, R13, R23, R33, R43, R53), which provide respectively independent fixed weighting coefficients. The resultant input values from the resistors are supplied to the neuron units of the intermediate layer, i.e. the units $U_{2,1}$ to $U_{2,3}$. Specifically, these weighted input signal values are applied to the inverting input terminals of the operational amplifiers 1a, 1b, 2a, 2b, 3a, 3b, to be additively combined. After having been amplified (and inverted or re-inverted) by the operational amplifiers of a neuron unit of the intermediate layer, the input signal sum is subjected to non-linear conversion by the diode pair of that neuron unit (10, 11 or 12) and then outputted to the next layer, which is the output neuron unit.

If the respective values for the resistors $R_{j,i}$, $R_j$ of the waveform equalizer have been suitably established, based on the weighting coefficient values that are obtained by the neural network learning operation described hereinafter, then the circuit of FIG. 8 will in effect execute a similar type of judgement of the distorted playback signal that is supplied thereto as would an experienced human observer. Thus the output signal produced from the waveform equalizer circuit of FIG. 8 will be closely similar to a signal that was originally recorded on a CD from which the playback signal is obtained, with level transitions of that output signal (corresponding to transitions between digital 1 and 0 levels) corresponding to those of the originally recorded signal. Accurate waveform equalization is thereby achieved.

Figure 7:
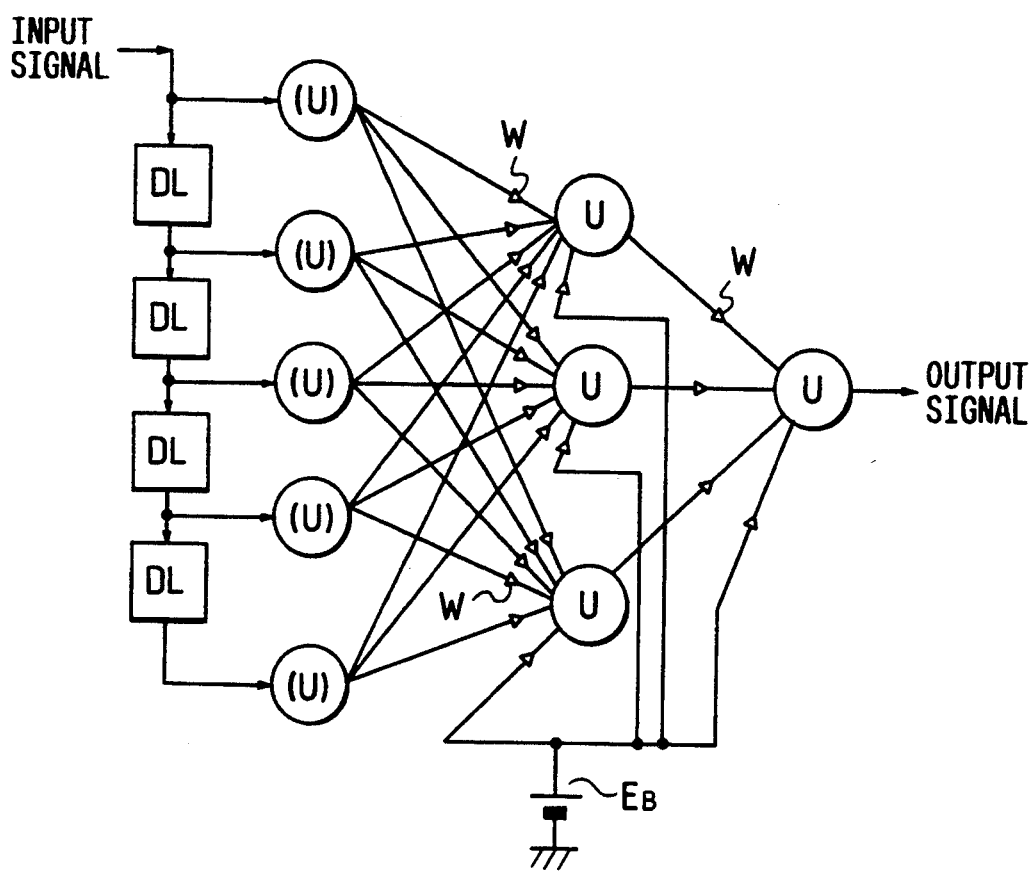
FIG. 7 shows an alternative configuration for the neural network of FIG. 5, in which fixed DC bias weighted input signals are supplied to neuron units.

It should be noted that various other configurations for the neural network of the waveform equalizer could be utilized, other than that of FIGS. 5 and 8. It may be found advantageous for example to apply respective weighted fixed DC bias inputs to each of the neuron units, as illustrated in FIG. 7. The respective values for the weighting coefficients W applied to these bias inputs, supplied from a common DC bias source $E_B$, are determined together with the other weighting coefficients W by a learning operation which is described hereinafter.

It should also be noted that the circuit arrangement shown in FIG. 8 is intended only to show the basic elements of that circuit in a simple manner, for ease of understanding, and does not necessarily show all of the components (such as resistors for local negative feedback) which may be required in a practical circuit. In particular, if the weighted input signals are inputted to the operational amplifiers as current signals, and all of the operational amplifers are of identical type, then it would be necessary to connect a resistor between the output of the first operational amplifier of each neuron unit (e.g. 1b) and the input of the second amplifier of that unit (e.g. 1a), and to scale down the values of the input weighting resistors of each first operational amplifier accordingly.

The procedure for determining suitable values for the resistors $R_{j,i}$, $R_j$ of the waveform equalizer of FIG. 8 is as follows. The procedure utilizes a suitably programed workstation (computer), and is based upon generating a simulated neural network of the form shown in FIG. 5, executing a learning operation to obtain suitable values for the weighting coefficients of that neural network, and then determining the respective values for the fixed weighting coefficients (i.e. resistor values) in the actual hardware neural network of the waveform equalizer.

Figure 10:
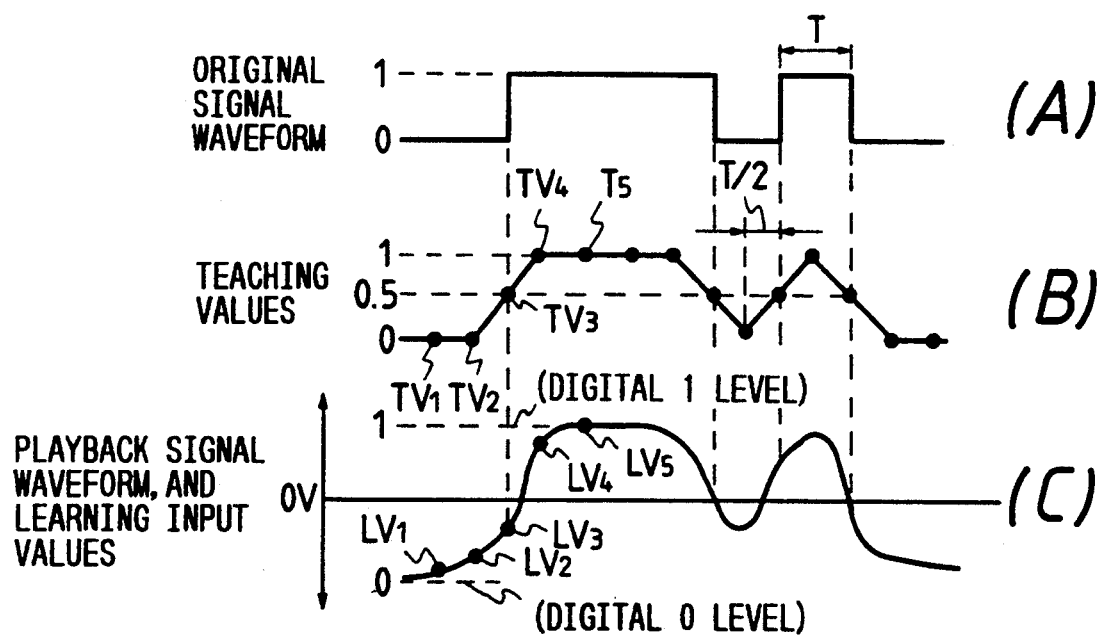
FIG. 10 is a timing diagram for illustrating the relationships between an original data signal used for neural network learning purposes, respective teaching values which are derived from that original data signal, and a distorted digital signal that results from recording and playback of the original data signal.

The basic principles of the learning operation for successively varying the values of the weighting coefficients W of the simulated neural network of FIG. 5 will be first described, referring to FIG. 10. In FIG. 10, diagram (A) shows a portion of the waveform of an original signal which is used for learning. For the purpose of achieving maximum accuracy of equalization, the learning operation utilizes data recorded on a CD in which the value of the aforemention minimum interval between transitions of the recorded data, Tmin, is made smaller than the standard value of 3 T. In the example of FIG. 10, Tmin is made equal to T. As shown in diagram (B), specific sample values (designated in the following as teaching values) are derived from the original signal, with these teaching values occurring periodically with a period that is equal to or less than the period T, and which is equal to T/2 in this example. These T/2 periods will be referred to as learning intervals. As shown, each teaching value which occurs immediately before a transition of the original signal from the digital 0 to digital 1 state takes the value digital 0, each teaching value which occurs immediately following a transition of the original signal from the digital 0 to digital 1 state takes the value digital 1, and each teaching value which coincides with a transition of the original signal between the digital 0 and digital 1 states takes a value which is midway between the digital 1 and 0 levels, which is indicated as a value of 0.5. Thus the teaching values are tri-state values, rather than digital values in this example.

Referring to diagram (C) of FIG. 10, the playback signal waveform from a CD, corresponding to the original signal waveform portion shown in diagram (A) will as shown in general be highly distorted. Periodic sampling of the playback signal is executed (as described hereinafter) to obtain successive values referred to in the following as learning input values, which respectively correspond to the aforementioned teaching values. Five of these learning input values are designated in diagram (C) as $LV_1$ to $LV_5$, which respectively correspond to the teaching values $TV_1$ to $TV_5$. Here, the term "respectively corresponding" signifies "occurring at respectively identical positions along the data sequence". These positions, within the playback signal, can be established (starting from a specific initial position, identified by a reference marker portion within the playback data) by using an appropriate clock signal as described hereinafter. Assuming that the playback signal varies about a central 0 V value, then for example the learning input value designated as $LV_3$ should ideally be 0 V, to correspond to the transition value 0.5 of the corresponding teaching value $TV_3$. Similarly, the learning input value $LV_4$ should ideally be a positive voltage value corresponding to a predetermined digital 1 level. However due to distortion effects such as aberration distortion described hereinabove, the learning input values will actually differ substantially from these ideal values.

Basically, the learning operation is as follows. The learning input values are successively inputted to the "delay lines" DL1 to DL4 of the simulated neural network, such that during each learning interval (corresponding to T/2 ) there will be a set of five learning input values being supplied to the input layer of the neural network. While the learning input value $LV_3$ is being supplied from DL2 (i.e. when the learning input values $LV_1$ and $LV_2$ are being supplied from the input and output of DL1 and $LV_4$ and $LV_5$ are being supplied from the respective outputs of DL3 and DL4), with resultant combinations of weighted input values being applied to the neuron units of the intermediate layer and a resultant combination of weighted input values being supplied to the final neuron unit $U_{3,1}$, the output value that is thereby produced from that final neuron unit is compared with the teaching value $TV_3$ that corresponds to $LV_3$. Based on the difference value obtained from that comparison, respective updated values for the weighting coefficients W of the neural network are computed, by using a backward propogation type of learning algorithm. In the next learning interval, i.e. when the learning input value $LV_4$ is being outputted from the delay line DL2, the resultant output value produced from the neural network as a result of the new combination of five input learning input values is compared with the teaching value $TV_4$, corresponding to $LV_4$, and the weighting coefficients are again updated accordingly based on the result of that comparison.

As mentioned hereinabove, the blocks designated as DL1 to DL4 in FIG. 5 do not represent actual delay elements, can be considered as respective data registers, through which the learning values are sequentially shifted, to obtain successive sets of five learning values that are inputted to the simulated neural network during respective learning intervals. Considering for example the first three learning input values to be supplied, after learning operation begins. The first learning input value is inputted to the unit $U'_{1,1}$ of the first layer of the neural network, and a resultant output signal value obtained from the output unit $U_{3,1}$ of the neural network (although there is no teaching value actually corresponding to that output value). The second learning input value is then inputted to the unit $U'_{1,1}$ while the first learning input value is being inputted to the second unit $U'_{1,2}$ of the first layer, and a resultant output value obtained from the neural network. Again, there is no corresponding teaching value to that output value. Next, the third learning input value is inputted to the unit $U'_{1,1}$ while the second learning input value is being inputted to the second unit $U'_{1,2}$ and the first learning input value is being inputted to the third unit $U'_{1,2}$ of the input layer. A resultant output value is obtained from the neural network. In this case, as will be understood from the above description of FIG. 10, there is a teaching value which is to be compared with that output value from the neural network (i.e. The teaching value that corresponds to the first learning input value), and so the learning algorithm will be executed for the first time.

However there is a basic practical problem in executing such a learning operation, in the case of a playback signal from a magnetic or optical recording and playback system. Referring to FIG. 11, a sequence of teaching values $TV_1$, $TV_2$, . . . are shown as occurring in a data sequence that is to be recorded on a recording medium, for example a CD. When a playback signal is subsequently obtained from that CD, then due to such factors as disk rotation drive system inaccuracy during recording and playback, the values $LV_1$, $LV_2$ etc which respectively correspond to the teaching values $TV_1$ etc. will not occur at regular intervals as measured with respect to a standard timebase. That is to say, if the playback signal is sampled at regularly spaced time points, which should ideally coincide with the respective positions of the learning input values in the playback data flow, in fact the sample values that are obtained will differ from the desired values. In FIG. 11, for example, (in which the degree of deviation is of course greatly exaggerated), sampling the playback signal at the $8^{th}$ reference time point R8 would result in a signal level near the learning input value $LV_7$ being selected, rather than the correct value $LV_8$ (i.e. the $8^{th}$ learning input value in the data sequence). Thus, correct learning operation will be impossible, unless the playback disk rotation speed is controlled to a very high degree of accuracy.

In a preferred embodiment of the present invention described in the following, the above problem is overcome by using a PLL (phase locked loop) circuit to derive the clock signal component of the playback signal, and to use the derived clock signal to determine the sampling time points (i.e. The points $R_1$, $R_2$, ... in the example of FIG. 5). In that case, the time-axis deviations of the learning input values $LV_1$, $LV_2$, etc. will be identical to those of the sampling time points, so that the correct learning input values (i.e. respectively corresponding to the predetermined teaching values $TV_1$, $TV_2$, etc.) can be accurately extracted from the playback signal by sampling that signal. Thus, the operation will be unaffected by deviations in the rotational speed of the CD 22.

Figure 13:
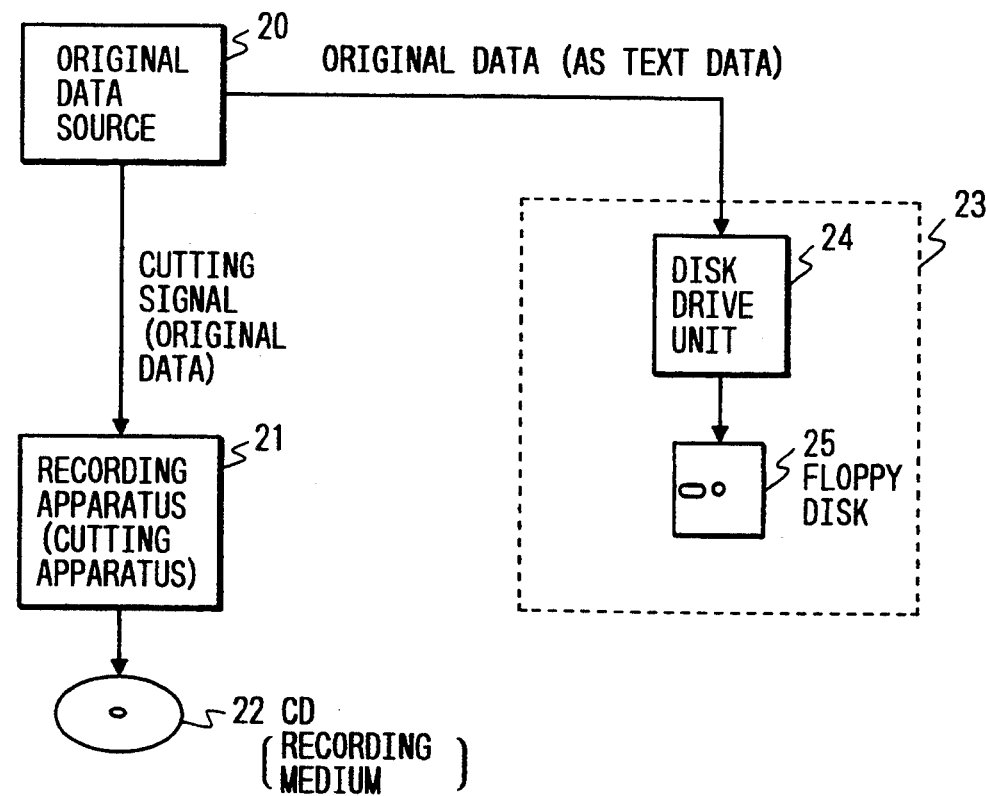
FIGS. 13 and 14 are general block diagrams to illustrate a method of deriving learning input values and teaching values for use in a learning operation to establish weighting coefficients for a neural network of a waveform equalizer according to the present invention.

The basic features of this embodiment will be described referring first to the general block diagrams of FIGS. 13, 14 and 15, assuming that a learning interval of T/2 is utilized (as in the example of FIG. 10 described above). FIG. 13 shows the apparatus required to record on a recording medium (in this case, a CD) data to be used in the neural network learning operation, which data will be referred to in the following as the learning data. The learning data are generated as a portion of original data that are produced from an original data source 20 and are supplied to a recording apparatus (i.e. cutting apparatus) 21 to be recorded on a CD 22. In addition to the learning data, this original data includes an identifying marker portion, preceding the learning data, for use in precisely identifying the start of the learning data, and a preamble portion preceding the identifying marker portion, for initial stabilization of PLL operation. The original data are also supplied, as text data, to be recorded on a floppy disk 25 by a disk drive unit 24. If for example a portion of the original data is of the form shown in diagram (A) of FIG. 12, i.e. a sequence of 2 T periods at the digital 1 state, 2 T at the 0 state, followed by 1 T at the digital 1 state, then that portion could be represented as text data as a sequence of numeric symbols ... 0, 1, 1, 0, 0, 1, 0, ....

Figure 14:
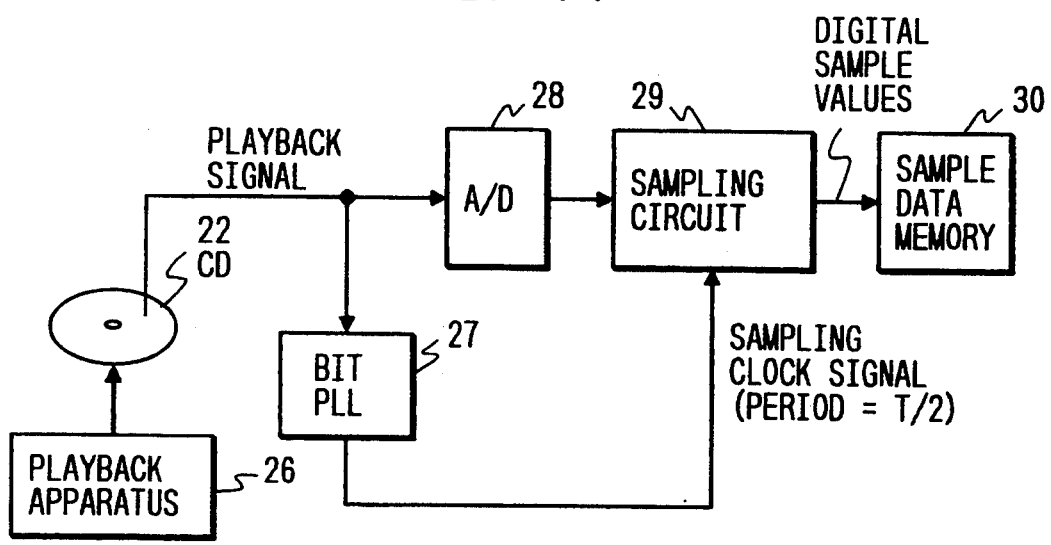

When the above recording operations have been completed, the apparatus shown in FIG. 14 are put in operation. A playback apparatus 26 rotates the CD 22 to derive a playback signal from an optical pickup, with that playback signal being supplied to an A/D converter 28 and to a PLL 27. The A/D converter 28 periodically converts the playback signal to successive digital sample values at a sampling rate that is substantially higher than the data rate of the recorded data, i.e. with a sampling period that is much shorter than the aforementioned period T. It will be assumed that this sampling rate is 100 MHz. These digital samples are supplied to a sampling circuit 29. The PLL 27 extracts the data clock signal (having the 1 T period) from the playback signal, and also frequency-multiplies that extracted clock signal by 2 to obtain a sampling clock signal having the desired period of T/2 (described above referring to FIG. 10). That sampling signal is supplied to the sampling circuit 29, for selecting successive digital samples, e.g. to select the first digital sample which occurs at or immediately after each sampling time point defined by the sampling clock signal applied to the circuit 29. These selected sample values are stored in a sample data memory 30.

Figure 15:
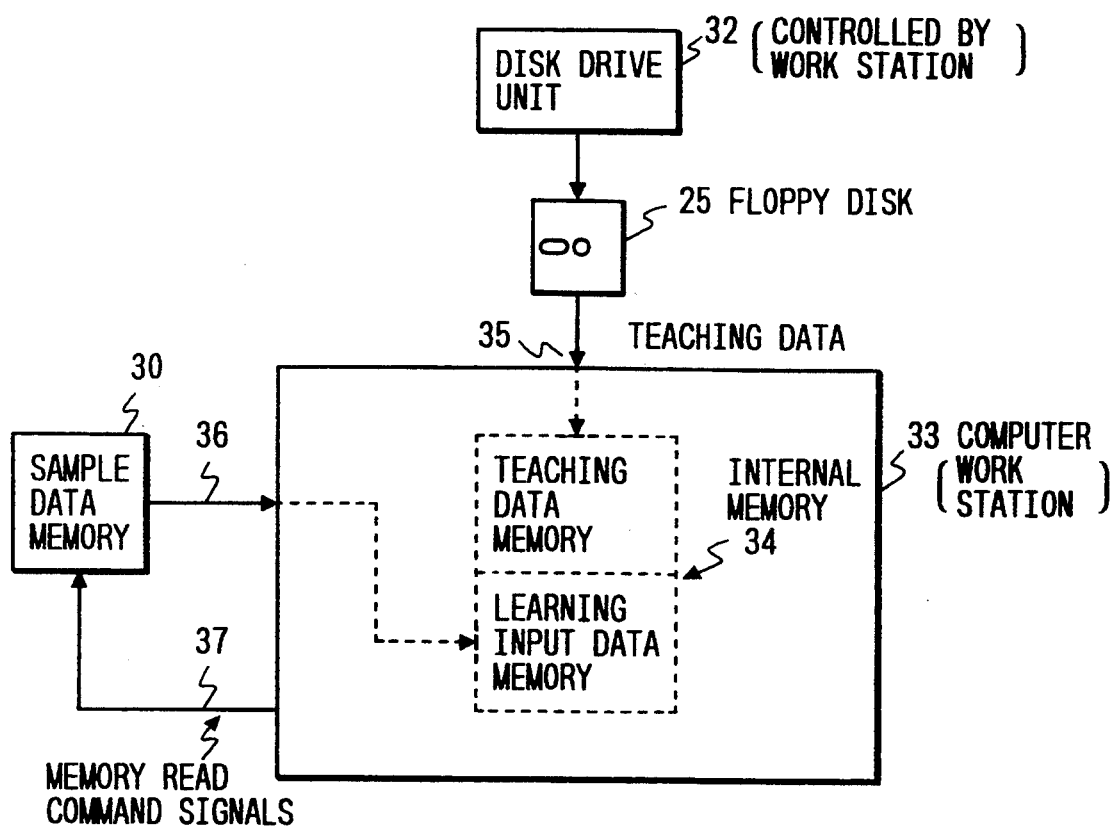
FIG. 15 is a block diagram for illustrating how learning input values and teaching values are taken into a computer, for executing that learning operation.

Next, the apparatus shown in FIG. 15 is used to set the learning input values and teaching values into a computer 33 (used as a work station) which executes the neural network simulation and learning operations. The learning data are read out as text data from the floppy disk 25 by a disk drive unit 32 which is controlled by the computer 33, are transferred into the computer 33 through an input port 35, and are then converted to suitable form for use as teaching values in the neural network learning operation. Specifically, assuming that the learning values are of the form described in FIG. 10 hereinabove (i.e. tri-state values of either digital 1 or 0 or the intermediate level 0.5), the text data sequence is converted by the computer 33 into a corresponding teaching value sequence, for example the sequence shown in diagram (C) of FIG. 12 in the case of the text data sequence of diagram (B) of FIG. 12. The teaching values thus obtained are successively stored in a teaching data region of an internal memory 34 of the computer 33.

The sample data values are successively read out from the sample data memory 30 under the control of read command signals supplied from the computer 33, to be transferred through an input port 36 to the computer 33. The computer 33 judges each of these input sample values, to determine when these correspond to learning input values, and stores the learning input values in a learning input data region of the internal memory 34. Specifically, the computer 33 examines the flow of input sample values from the memory 30 to detect the start of the learning data, as indicated by the aforementioned marker portion of the playback data from the CD. For example, the computer 33 can then for example simply transfer each sample value which occurs, following that marker portion, into the learning input data memory as a learning input value (assuming that all of the sample values in the learning data portion are to be used as learning input values). Alternatively, as described hereinafter, the computer 33 can operate on successive groups (e.g. successive pairs) of these sample values which occur after the start of the learning data, to derive respective learning input values.

With the teaching values and learning input values having now been stored in the internal memory 34, the neural network learning operation described hereinabove is started, and continued until all of the learning data have been utilized, and a sufficient degree of convergence has been reached for the successively obtained values of neural network weighting coefficients derived in the learning operation.

Figure 16:
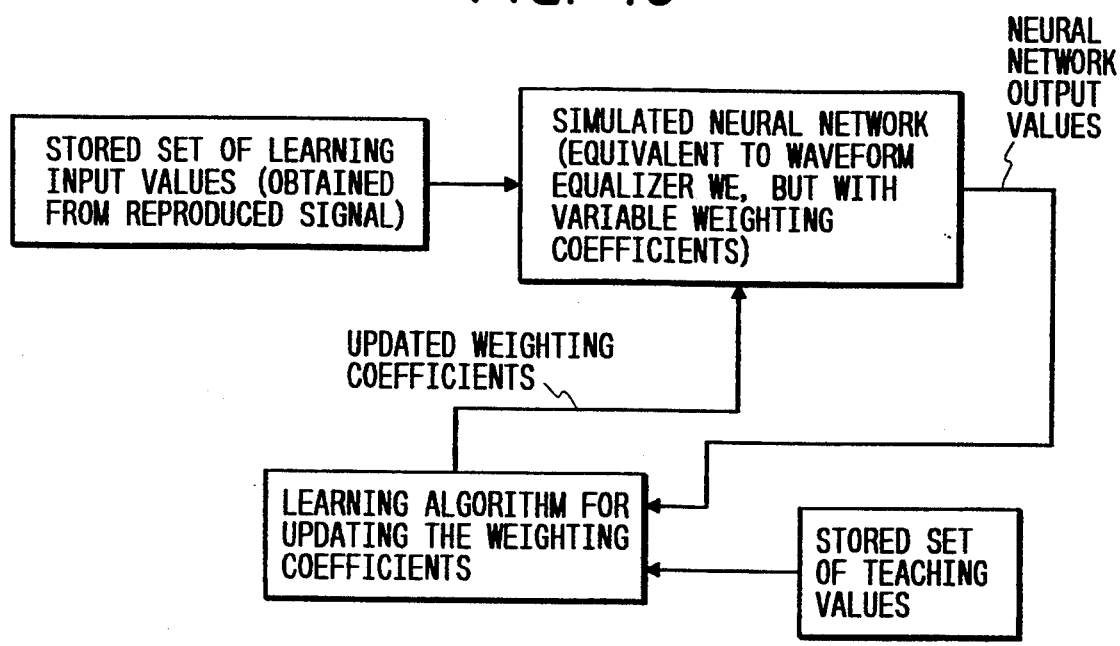
FIG. 16 is a diagram for illustrating the basic principles of the neural network learning operation.
Figure 17:
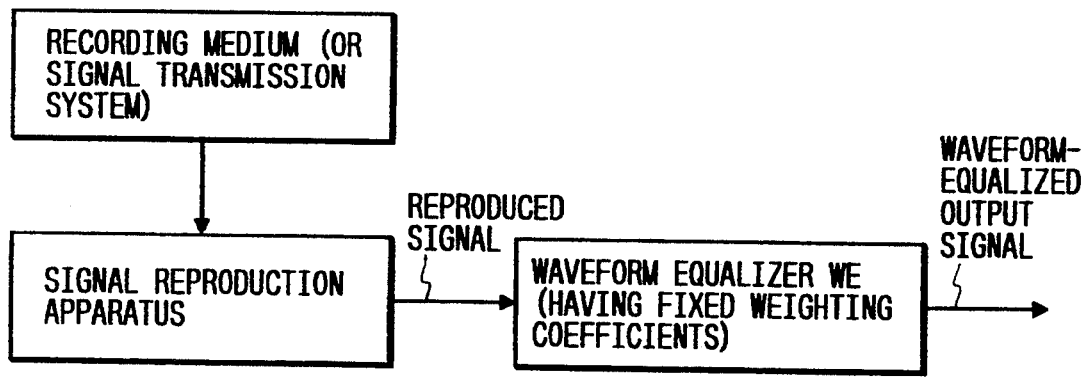
FIG. 17 is a diagram for illustrating how a waveform equalizer according to the present invention is utilized after fixed weighting coefficients have been established by the neural network learning operation.

The basic operations executed during the neural network learning operation and during normal functioning of the waveform equalizer (after fixed weighting coefficients have been established by the learning operation) are illustrated in FIGS. 16 and 17 respectively. During the learning operation as illustrated in FIG. 16, the learning input values and teaching values that have been stored in the internal memory of the computer as described hereinabove are successively read out, with the learning input values being inputted to the neural network of FIG. 5, with the resultant output values produced from the simulated neural network being compared with respective teaching values, and the comparison results used in the learning algorithm, to establish updated values for the weighting coefficients of the neural network.

Upon completion of that learning operation, fixed values for the resistors in the waveform equalizer (i.e. for the fixed weighting coefficients of the neural network of that waveform equalizer) are determined based on the final values obtained for the respectively corresponding weighting coefficients of the neural network. When a distorted playback signal is now inputted to the waveform equalizer, an accurately waveform-equalized optical signal is obtained, as illustrated in FIG. 17.

To establish weighting coefficient values for the neural network such that satisfactory equalization will be achieved by the waveform equalizer even when the playback signal may be distorted in various ways, a plurality of respectively differently distorted types of learning data are used in the learning operation. These different types of learning data will be referred to in the following as respective learning data categories, and can be generated for example by operating the playback apparatus 26 under respectively different conditions of incorrect adjustment of the optical pickup which reads data from the CD 22. In that way, respective learning data categories can be obtained in which distortion of the digital playback signal from the CD is the result of defocusing, spherical aberration, coma aberration along the direction of disk rotation, coma aberration that is opposite to the direction of disk rotation, etc. In the learning operation, learning is first executed for one of these learning data categories, to obtain a final set of weighting coefficients for the neural network, then the learning is repeated using the next category of learning data, and so on for each of the categories.

Figure 22:
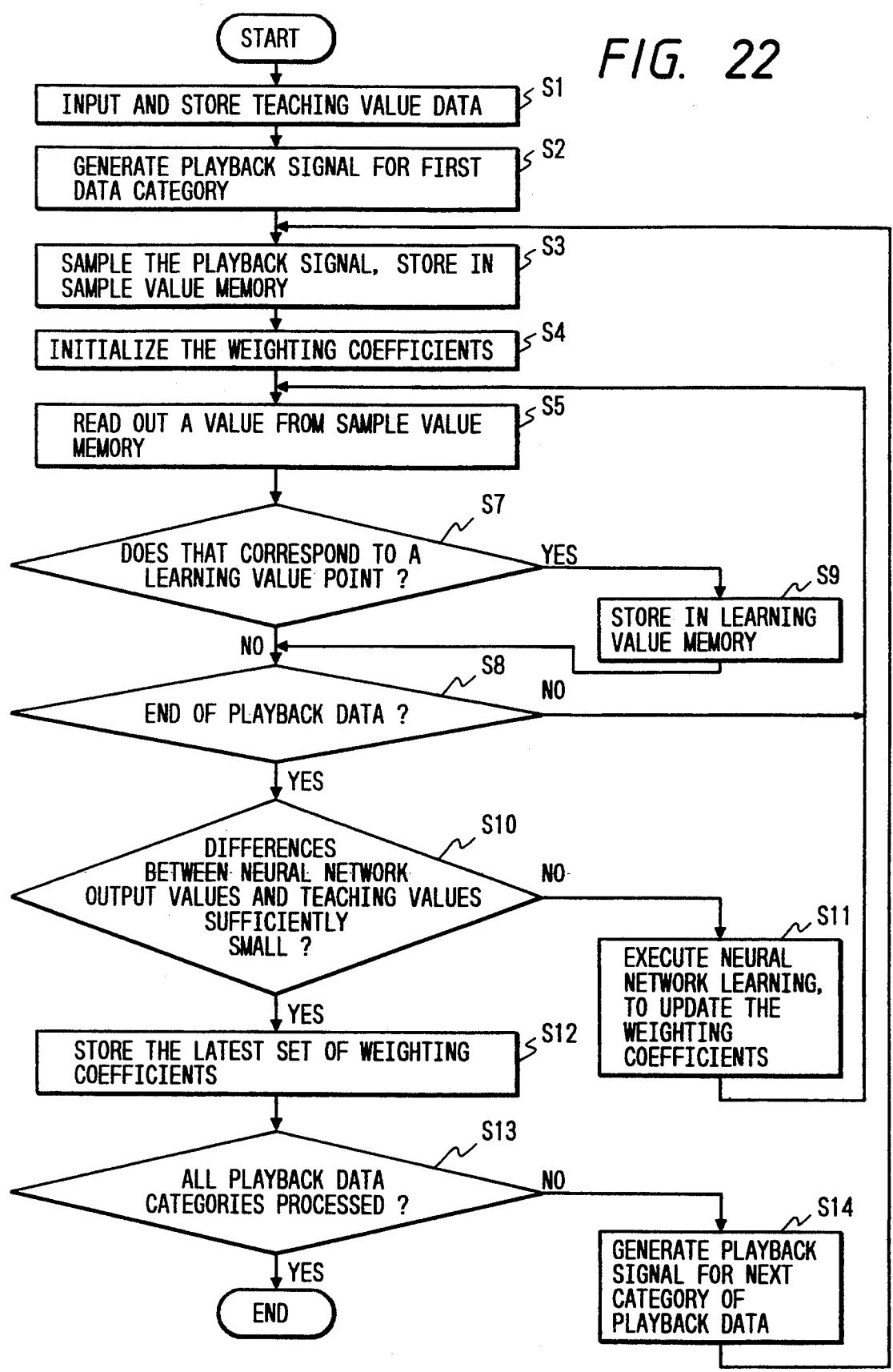
FIG. 22 is a flow diagram showing an example of a basic sequence of operations of the neural network learning operation.

The overall flow of such learning operation is illustrated by the flow diagram of FIG. 22. Firstly, the teaching data from the floppy disk 25 are transferred into the computer 33 as text data, and are then converted into a corresponding sequence of teaching values, e.g. tri-level teaching values as illustrated in diagram (C) of FIG. 12, with each transition between the digital 1 and 0 levels in the original signal being converted to an intermediate (0.5) level, and with the teaching values corresponding to sample values occurring at T/2 intervals.

For example, referring to diagrams (A) and (B) of FIG. 10, the set of teaching values $TV_1$ to $TV_5$ would be obtained as the sequence of values 0, 0, 0.5, 1, 1 (where "1" and "0" here represent digital 1 and 0 levels). The teaching values thus obtained are stored in the teaching data memory region of the internal memory 34. The playback signal for the first learning data category is then obtained from the CD 22, and the selected digital sample values are stored in the sample data memory 30 (step S3). Next in step S4, initial values for the weighting coefficients of the simulated neural network are established, e.g. as random values.

The first of the sample values that were stored in the sample data memory 30 is then read into the computer 33 and a simulated output is calculated (step S5), and a decision is made as to whether or not the timing of the output corresponds to that of the teaching values. If so, it is stored in the learning input value data memory region of the computer, then if the end of the playback data has not yet been reached (judged in step S8) the next sample value is read out from the sample data memory 30 and the above process repeated. When the end of the playback data for that learning data category is reached, the neural network learning operation is commenced (step S10), with successive ones of the stored learning input values being read out and supplied to the simulated neural network of FIG. 5. When the end of that processing is reached, i.e. when all of the teaching values have been used in the learning operation, a decision is made as to whether or not a satisfactory set of weighting coefficient values has been derived. This can be decided either by repetitively executing that learning operation (step S5 to S11) until the values obtained for the weighting coefficients cease to change (as they are successively updated), or by judging whether the differences between the output values produced from the neural network and the teaching values have become sufficiently small.

The final set of weighting coefficients thus obtained are then stored, and in step S13 a decision is made as to whether or not all of the learning data categories have been processed. If not, a playback signal for obtaining the next learning data category is generated (step S14) and the operation then returns to step S3, in which that playback signal is sampled. In this case, the initial values to which the weighting coefficients are set in step S4 can be the values obtained for the preceding learning data category, which were stored in step S12.

The above process is successively repeated for each of the learning data categories, to obtain a final set of weighting coefficients.

It should be noted that it would be equally possible to supply successive sample values from the sample data memory 30 to be directly used in the neural network learning operation, instead of temporarily storing all of the output values in an internal memory of the computer.

Figure 18:
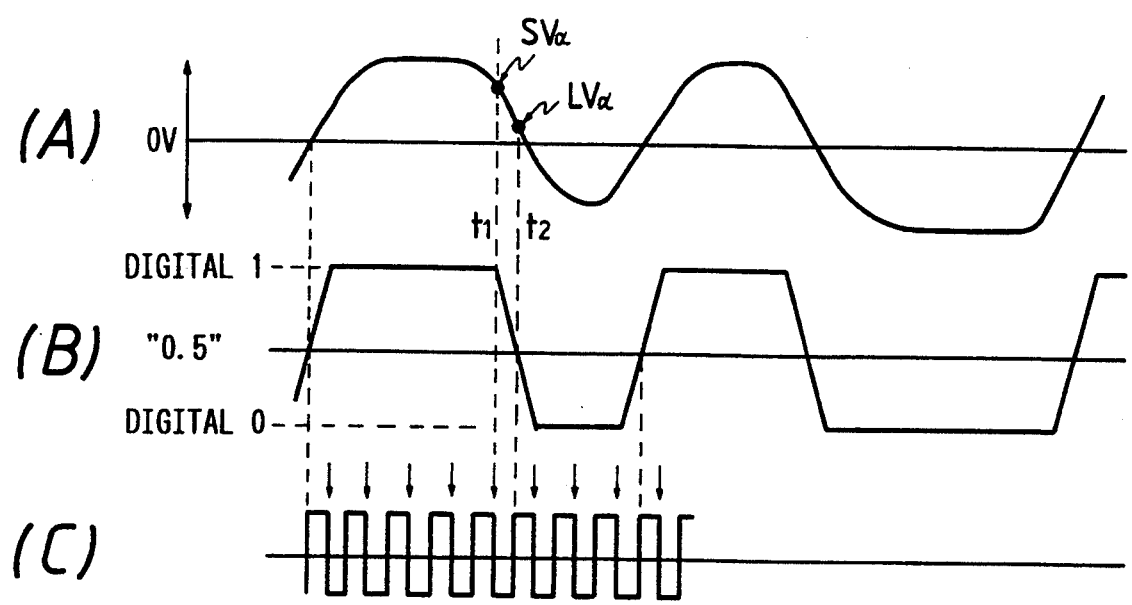
FIG. 18 is a timing diagram for illustrating a fixed time deviation which may exist between time points at which a playback signal is sampled by a clock signal derived by a PLL shown in FIG. 14, and the correct time points.

In the above it has been assumed for simplicity of description that the time points defined by the clock signal from the bit PLL 27 in FIG. 14 coincide precisely with the desired learning input value points, in the playback data stream. That assumes for example, referring to FIG. 11, that sampling time points are defined which respectively coincide in time with the learning input values $LV_1$ etc. in the playback signal. However in practice that is not necessarily so, i.e. there will be some degree of fixed displacement between the sampling points defined by the PLL output and the learning input value positions. If the learning period (which is T/2 in the embodiment described above) is made sufficiently small in relation to the data period T then that deviation of the sampling points is not a significant problem. However if the learning period is relatively large, as illustrated in FIG. 18 (in which the arrows in diagram (C) indicate the time points defined by the sampling signal produced from the bit PLL, and diagram (B) shows the corresponding teaching signal waveform) then for example there may be a significant deviation between a desired learning input value time point t2 in the playback data (shown in diagram (A)) and the preceding sampling time point, i.e. t1. In that case, a sample value $SV_a$ will be obtained which is significantly different from the desired value $LV_a$, as shown.

Figure 19:
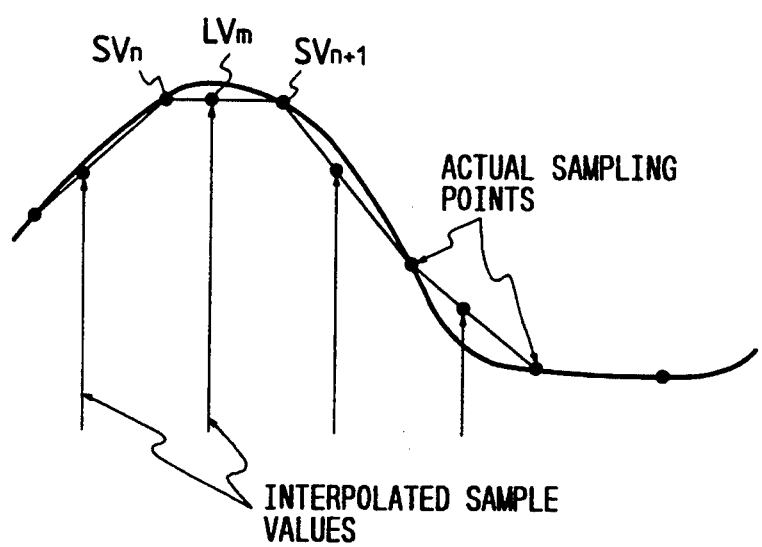
FIG. 19 illustrates derivation of respective learning input values by interpolation of sample values, for reducing the effect of the time deviation shown in FIG. 18.

In such a case, it may be preferable to obtain each learning input value by interpolation of two successive sample values, as illustrated in FIG. 19. Here, a learning input value $LV_m$ is obtained by interpolation between two adjacent sample values $SV_n$ and $SV_{n+1}$.

It should also be noted that although in the learning operation of the embodiment described above, each of the sample values obtained in the learning data portion of the playback signal is used as a learning input value, in practice it may preferable to use a greater number of samples to obtain each learning input value. For example, the playback signal could be sampled at T/8 intervals, with the learning interval being T/2, and with each learning input value being calculated based on a combination of four successive sample values.

Figure 21:
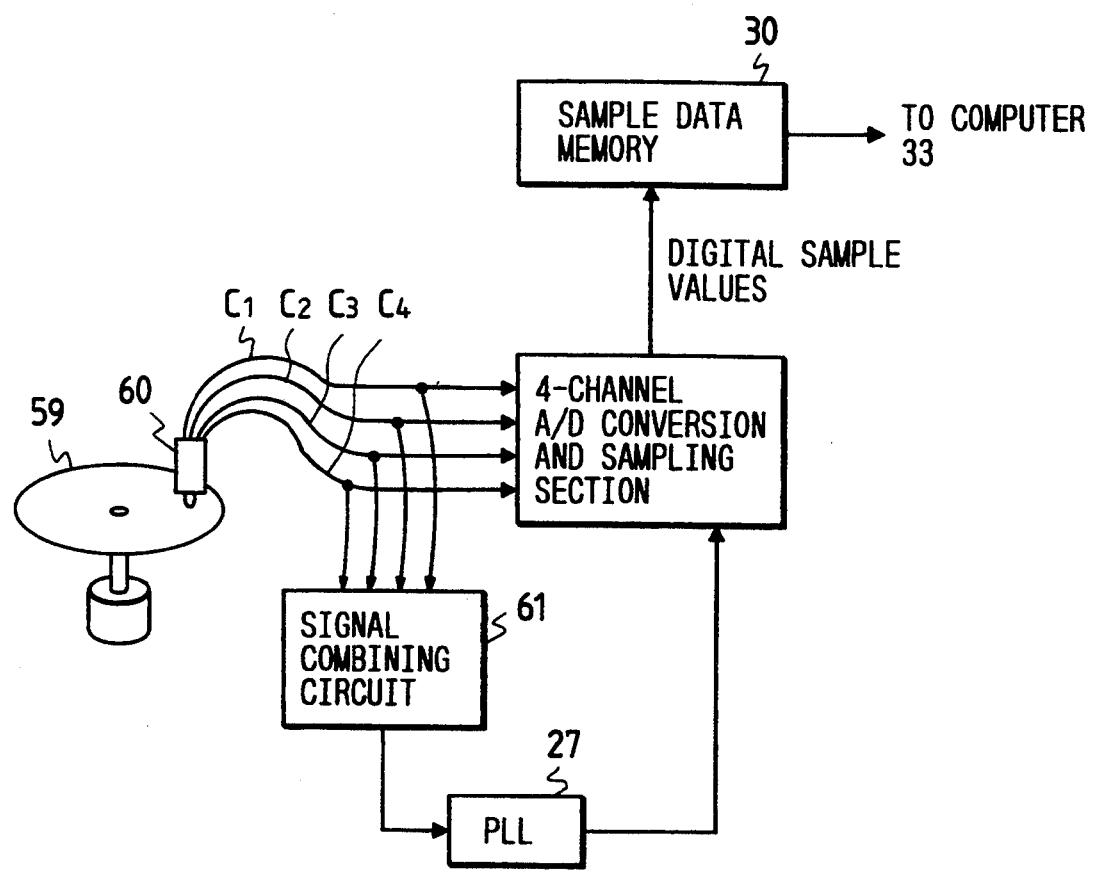
FIG. 21 is a block diagram for illustrating the extraction of a clock signal by a PLL from 4-channel playback signal outputs obtained from a CD.

Furthermore, there are various types of CD playback apparatus which utilize an optical pickup which provides four playback signal channels, i.e. respectively derived from a set of four spatially separated pickup elements. These four playback signals can provide information to be used in systems which control the optical system of the pickup, for example the focussing. These four playback channel signals are preferably used to extract a more accurate data clock signal by the bit PLL of the above embodiment, as illustrated in FIG. 21. Here, the playback signals of the four channels, designated as C1 to C4, are combined in a signal combining circuit 61, to obtain an input signal for the bit PLL 27. Higher stability and accuracy of PLL operation is thereby achieved. In addition, these four channel signals can be separately sampled, using the output signal from the PLL, to obtain 4-channel digital sample values which are stored in the sample data memory 30, to be subsequently transferred to the computer 33 for the learning operation. In that case, after each of these 4-channel sample values is inputted to the computer, the four sample values are combined by the computer to obtain a single sample value, which is then operated on by the computer as described hereinabove for the case of single-channel operation.

Figure 20:
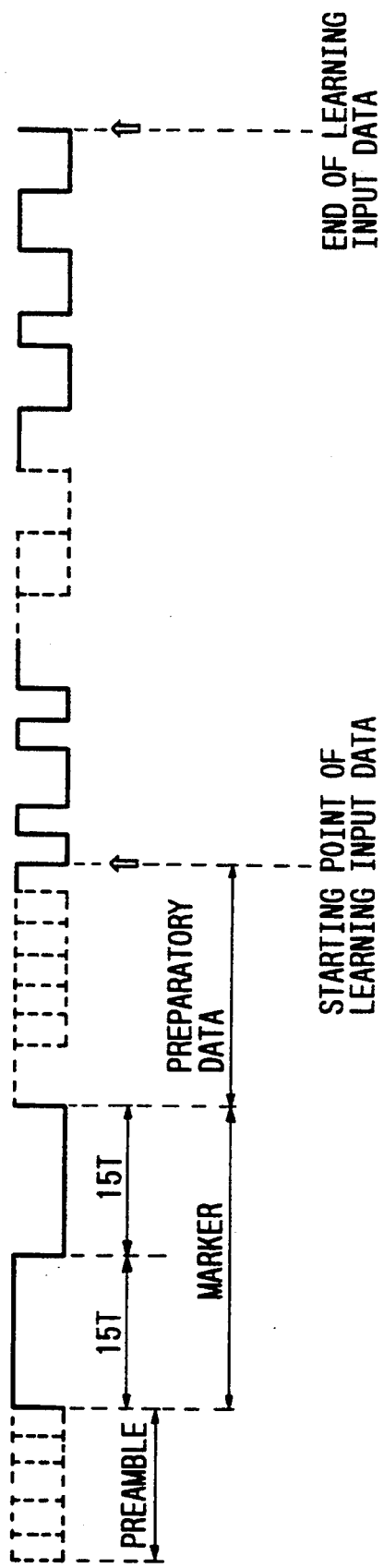
FIG. 20 is a timing diagram for illustrating how data recorded on a CD, to be used in the neural network learning operation, include a marker portion for precisely identifying the starting point of learning data within that recorded data.

As described hereinabove it is essential, for accurate learning operation of the embodiment described above, for the computer 33 to precisely identify the start of the learning data portion of the playback data which are inputted thereto. This is done by inserting an initial marker portion in the playback signal, containing a data pattern which will not otherwise occur in the playback data. Specifically, that marker portion consists of successive sets of 15 T periods of data at the digital 1 level and 15 T of data at the digital 0 level, as illustrated in FIG. 20 which shows the data format of the playback signal used for learning operation. Firstly there is a preamble portion, i.e. a burst of data which is suitable for stabilizing the bit PLL operation. This is followed by the aforementioned marker portion, which is succeeded by a preparatory data portion, i.e. another burst of data which is suitable for stabilizing the PLL operation, since the long 15 T data states at the 1 and 0 levels do not occur during normal operation. The starting point of the learning input data is thereby identified (by the clock signal extracted by the PLL) as occurring at exactly the end of the preparatory data portion. Such highly precise identification of the start of the data to be used for neural network learning operation, in conjunction with corresponding predetermined teaching data, is a necessary feature of the present invention. It has been found that satisfactory results are obtained if the length of the learning data portion is made approximately 3000 T.

In the embodiment described above, teaching values which are intermediate between the digital 0 and 1 levels (i.e. 0.5) are utilized, and it has been found that this feature greatly increases the speed with which the learning operation can be executed to obtain final values for the weighting coefficients, and the accuracy of the waveform equalization that is provided by the finally designed waveform equalizer. It would be also possible to use a shorter value of learning interval than the value of T/2 used in the above embodiment. In that case, a plurality of intermediate values (between the digital 0 and 1 levels) could be used for the possible levels of the teaching values, in addition to the digital 0 and 1 levels.

Figure 23:
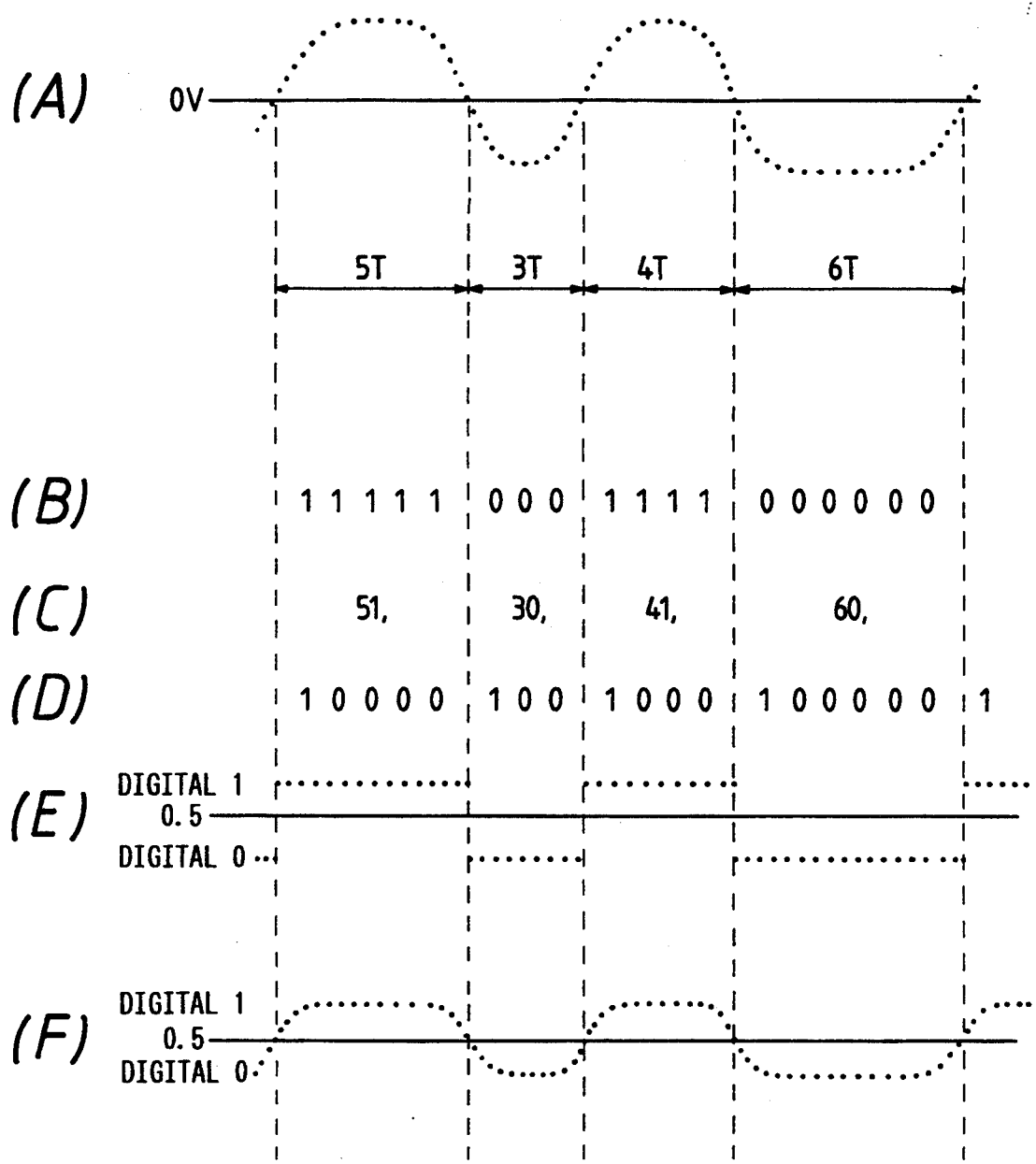
FIG. 23 is a timing diagram for illustrating sampling operations in a second method of deriving teaching values and learning input values for the neural network learning operation.

A second method of establishing the teaching values and learning input values to be used in the neural network learning operation will now be described. This method differs from that described above in that the bit PLL is not used to extract a clock signal from the playback signal. That is to say, referring to FIG. 14, the PLL 27 and sampling circuit 29 are omitted in this case. Apart from that, the system used can be as illustrated in FIGS. 13, 14 and 15. The playback signal from the CD 22 is converted to digital sample values at the very high sampling rate of the A/D converter 28 (e.g. 100 MHz), and these sample values are stored in the memory 30. A portion of the resultant data stored in the sample data memory 30 can for example be considered to be as illustrated in diagram (A) of FIG. 23. The text data representing the corresponding portion of the teaching data (i.e. corresponding to the playback data sequence of 5 T periods at a positive level, 3 T at a negative level, 4 T at the positive level, and 6 T at the negative level in this example) could be as shown in diagram (B), or alternatively as shown in diagram (C) or diagram (D). When these text data are transferred into the computer 33, they are converted into a sequence of digital 1 or 0 values, which occur at spacings corresponding to those of the learning input values, as illustrated in diagram (E) of FIG. 23. That is to say, if for example a certain portion of the playback signal data sequence has been converted into a set of 1,000 sample values by the 100 MHz sampling operation, then the corresponding portion of the teaching value data sequence is converted into 1,000 discrete digital values. These discrete digital teaching values are then transferred through a suitable digital low-pass filter, i.e. a FIR filter, to be converted into a sequence of discrete values which can take the 0 and 1 digital levels and also a plurality of levels which are intermediate between these digital levels, such that these teaching values conform to to an ideal teaching signal waveform as illustrated in diagram (F) in FIG. 23.

Referring now to FIG. 17, to obtain the learning input values that are to be set into the internal memory 4 for use in the neural network learning operation, the first part of the sample data held in the sample data memory 30 is transferred into the computer 33, to detect the aforementioned marker portion. After the start of the learning data is thereby detected, successive sample values are transferred from the sample data memory 30 in response to read command signals sent from the computer 33, successive periodically occurring ones of these sample values are selected to be used as learning input values. This can be done for example by counting the number of times the read command signal is generated, to thereby determine the size of the learning interval, i.e. The separation between successive learning input values. If for example the desired learning interval is 231 ns and a 100 MHz sampling frequency is used to obtain the sample values (so that the period of the sample values is 10 ns), then it can be arranged that each time a count of 23 is reached for the sample values read out from the sample data memory 30, the sample value then read out is selected by the computer 33 to become a learning input value and stored in the internal memory 34, while in addition that count number is increased to 24 each time 10 successive sample values have been selected. In that way, the average value of learning interval will be 231 ns, i.e. sample values will be periodically selected at spacings corresponding to 231 ns.

In order to obtain a set of teaching values which will respectively correspond to the learning input values thus obtained, a similar type of periodic selection operation is executed on the aforementioned discrete digital teaching values which correspond to the 100 MHz sample values. When these mutually corresponding sets of teaching values and learning input values have thus been derived and stored, the subsequent neural network learning operation can be carried out as described hereinabove.

This method of obtaining the learning input values has the basic disadvantage of requiring a very high accuracy of control of the speed of rotation of the CD 22, since only a fixed-frequency clock signal is used for sampling the playback signal to obtain the learning input values. With the method which utilizes a PLL to extract the clock signal component of the data in the playback signal, on the other hand, a sampling signal can be generated (e.g. by frequency-multiplying the extracted clock signal) that is phase-locked to the contents of the playback signal data, irrespective of changes in the speed of rotation of the CD from which the playback signal is obtained.

As described hereinabove referring to FIG. 8, that waveform equalizer circuit is based on a neural network having fixed weighting coefficients, whose values are determined by respective resistors R11, R21, etc. In addition, by forming each neuron unit (i.e. signal conversion unit) of that circuit as a pair of series-connected inverting operational amplifiers, it becomes possible to select the weighting coefficient values to be either negative or positive. Thus a combination of weighted input signals of either polarity can be inputted to each neuron unit, and in particular to the final (output) neuron unit. This has been found to provide substantially improved accuracy of waveform equalization, particularly when a very high frequency signal is to be equalized, by comparison with a more simple circuit configuration in which only which only weighted signals of identical polarity are inputted to each of the neuron units.

It should be noted that it might be possible to simplify the circuit of FIG. 8, by arranging that signals of appropriately different polarity are outputted from the neuron units of the intermediate layer, to be supplied to the output layer, i.e. to the final neuron unit. In that case it would be possible to eliminate one of the two operational amplifiers 4a, 4b of that final neuron unit.

Furthermore as a result of providing non-linear input/output characteristics for the neuron units (i.e. conversion units) of the waveform equalizer circuit of FIG. 8 by using diode clipping circuits, each having three input/output regions E1, E2 and E3, which have respectively different linear characteristics, the circuit of the waveform equalizer can have a very simple configuration. Moreover due to the fact that the learning computation processing based on the simulated neural network will also utilize such a form of non-linear input/output characteristic, the learning processing can be simple and efficient.

Figure 24A:
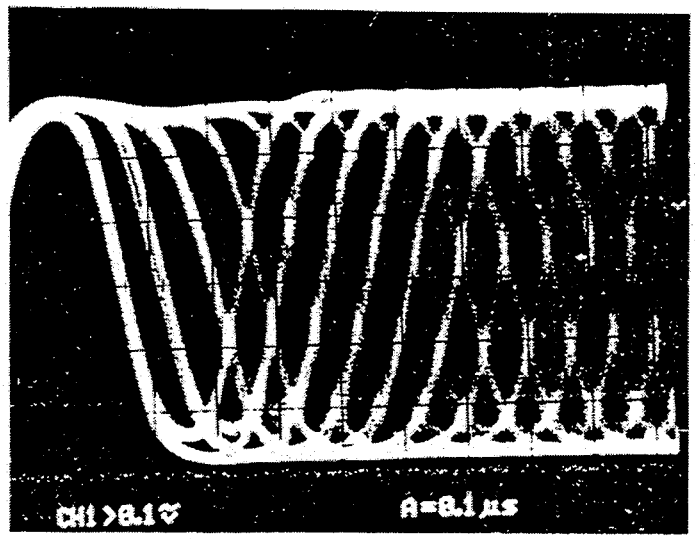
FIG. 24 shows examples of output signal waveforms obtained from a waveform equalizer according to the present invention, from a prior art type of waveform equalizer, and distorted digital signal waveforms which have not been equalized.
Figure 25A:
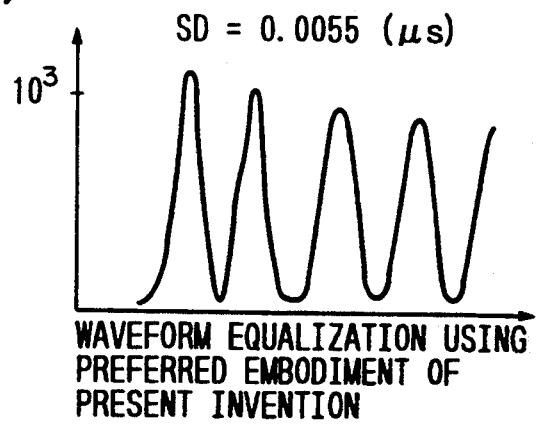
FIG. 25 shows results obtained by a time interval analyzer, for the case of a waveform equalizer according to the present invention, a prior art example of a waveform equalizer, and for no equalization, respectively.

A waveform equalizer formed of a neural network WE was constructed, using the design method described hereinabove in which a PLL is utilized in extracting sample values to be used as learning input values for the neural network learning operation. The circuit configuration was as shown in FIG. 8. FIG. 24(A) is a waveform photograph showing the effects of equalization by that waveform equalizer. FIG. 25(A) shows the analysis results obtained for the waveform equalizer, obtained by using a time interval analyzer. The test conditions were as follows:

a. Recording medium

The recording medium used was a CD having a 2.8 times increase in recording density by comparison with the standard CD recording density (specifically, with the track pitch made 0.95 micron, to obtain a 1.68 times increase in recording density, and with the linear direction density increased by 1.67 times), and using optical recording with a linear velocity of 2.5 m/s for scanning the CD tracks by the pickup. That linear velocity is approximately twice the standard value of linear velocity used for a CD.

b. Playback apparatus

An optical type of playback apparatus employing an optical pickup was used.

Laser light wavelength=670 nm

Lens NA (numerical aperture)=0.6 c. Learning conditions for neural network

All learning was executed by using a back-propogation method. Five categories of learning data were derived for use in the learning operation, by executing specific misadjustment of the optical system of the playback apparatus. These learning data categories were respectively obtained under conditions of:

(1) Defocussing of the optical system,
(2) Coma aberration directed along the positive radial direction
(3) Coma aberration directed along the negative radial direction,
(4) Coma aberration directed along the positive tangential direction, and
(5) Coma aberration directed along the negative tangential direction.

d. Results

Figure 24B:
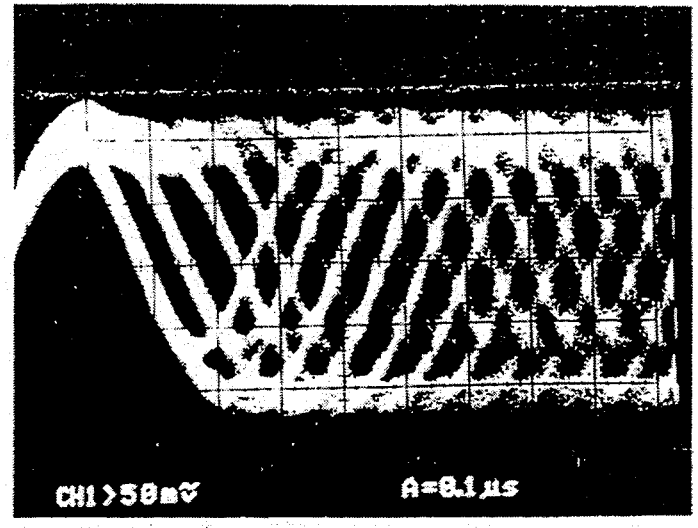
Figure 24C:
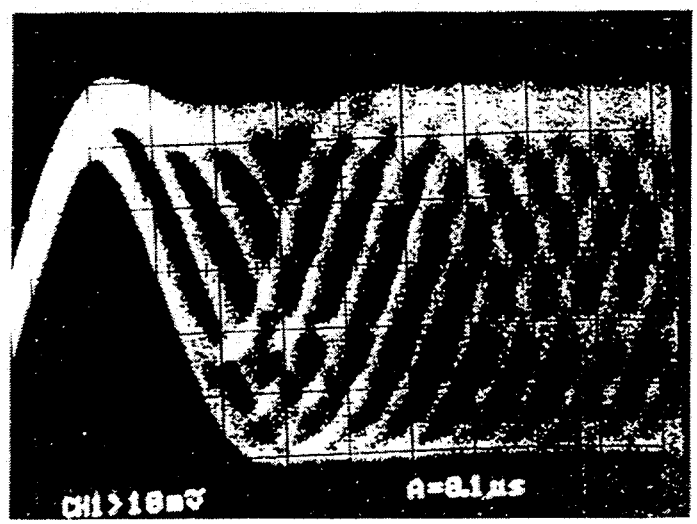
Figure 25B:
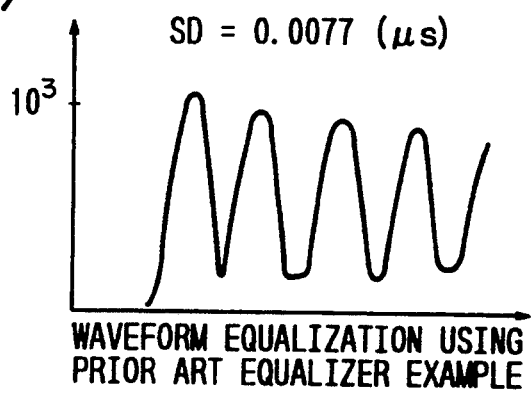
Figure 25C:
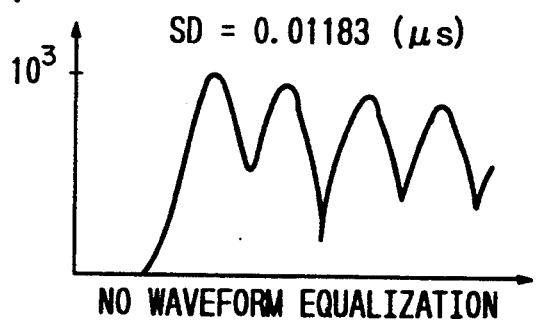

FIG. 24(A) shows eye pattern waveforms of an equalized digital signal obtained using the above embodiment of a waveform equalizer according to the present invention, and FIG. 25(A) shows the corresponding analysis results obtained, using a time interval analyzer. FIG. 24(B) similarly shows waveforms obtained for the case of waveform equalization using the prior art waveform equalizer of FIG. 1, and FIG. 25(B) shows the analysis results obtained for that prior art apparatus. FIG. 24(C) shows the eye pattern waveforms for a playback signal with no waveform equalization applied. FIG. 25(C) shows the corresponding analysis results obtained for the case of a playback signal with no waveform equalization applied.

The above results were obtained, in each case, for a playback signal having distortion due to coma aberration which is directed along the positive tangential direction.

As will be clear from FIGS. 24(A) to (C), this waveform equalizer embodiment removes intersymbolic interference from the playback signal, and provides a distortion-free eye pattern. Furthermore as will be clear from FIGS. 25(A) to (C), showing the results of analysis of the waveform equalization by using a time interval analyzer (using a timebase of 1 ns and $10^5$ samples), the data bits are spaced substantially equidistantly, as a result of the operation of the waveform equalizer WE, and clearly are well separated, with the amount of jitter standard deviation being small.

Thus with this waveform equalizer, it becomes possible to achieve accurate reproduction of a digital signal which contains various types of distortion resulting from intersymbolic interference, caused by various types of optical aberration. Results are obtained which have not been possible in the prior art. Moreover, since the design method is based on a neural network, the design process is simple.

It can be understood from the above that with a waveform equalizer according to the present invention, the apparatus configuration is simple, and high-speed signal processing is made possible. Hence the invention enables effective removal of distortion in a digital signal produced from a playback system or from a transmission system, by real-time operation, and with a level of performance being attained that has not been possible with prior art types of waveform equalizer.

Although the present invention has been described in the above with reference to an embodiment of a waveform equalizer for use with an optical type of data recording and playback system, it will be clear that the invention could also be applied to a waveform equalizer for use with a distorted digital signal produced from a magnetic type of recording and playback system, or produced from a receiving apparatus of a digital data transmission system.

It should be noted that various modifications to the described embodiment could be envisaged, such as using a different number of neuron units in the circuit of FIG. 8, for example using a different number of neuron unit layers, etc., which fall within the scope claimed for the present invention.

Furthermore, in the method of designing such a waveform equalizer, various other arrangements other than those described hereinabove could be envisaged for deriving a set of learning input values and a corresponding set of teaching values for use in the neural network learning operation.

What is claimed is:

1. A method of designing a waveform equalizer for waveform equalization of a distorted digital signal produced from a digital signal recording and playback apparatus, said waveform equalizer being formed as a neural network comprising a plurality of neuron units which are interconnected by linking elements providing respective fixed weighting coefficients, wherein respective values for said fixed weighting coefficients are mutually independently established by:

generating a set of original data, and storing said original data in a first memory means;

recording said original data as digital data values on a recording medium, and subsequently executing playback of said recorded original data, to obtain a playback digital signal;

periodically sampling said playback digital signal with a sampling period that is less than or equal to a data period of said digital data values, to obtain successive digital sample values to be used as learning input values, and storing said learning input values in a second memory means;

generating a simulated neural network having variable weighting coefficients, by using a computer, said simulated neural network being an equivalent circuit of said waveform equalizer neural network;

supplying successive ones of said learning input values from said second memory means to said computer to be sequentially inputted to said simulated neural network;

supplying successive data values of said original data, respectively corresponding to said learning input values, from said first memory means to said computer to be used as teaching signal values for comparison with respective output values produced from said simulated neural network;

repetitively executing a learning algorithm utilizing results obtained from said comparison, to successively alter said variable weighting coefficients of the simulated neural network, until a predetermined degree of convergence is obtained for values of said variable weighting coefficients; and establishing respective values for said fixed weighting coefficients of the waveform equalizer neural network, based upon final values obtained for corresponding ones of said variable weighting coefficients of the simulated neural network.

2. A method of designing a waveform equalizer according to claim 1, comprising the further step of combining a plurality of successive ones of said digital sample values to obtain each of said learning input values.

3. A method of designing a waveform equalizer according to claim 2, wherein said step of obtaining each of said learning input values comprises interpolating between two successive ones of said digital sample values.

4. A method of designing a waveform equalizer according to claim 1, wherein said sampling step comprises the steps of utilizing a phase locked loop to receive said playback digital signal, to extract a clock signal from said playback digital signal and to generate a sampling clock signal based on said extracted clock signal.

5. A method of designing a waveform equalizer according to claim 1, wherein said operation of periodically sampling said playback digital signal comprises executing said sampling with a sampling period which is substantially shorter than said data period, executing said sampling using a fixed-frequency sampling clock signal, and obtaining said learning input values by selecting one out of each of successive fixed pluralities of said sample values.

6. A method of designing a waveform equalizer according to claim 5, wherein said teaching values are derived by:

dividing said original data into successive discrete digital values respectively corresponding to said sample values;

transferring said discrete digital values through a digital low-pass filter to obtain filtered data values; and obtaining said teaching values by selecting successive ones of said filtered data values by an identical selection operation to said operation for selected said learning input values from said digital sample values.

7. A method of designing a waveform equalizer according to claim 1, wherein said periodic sampling of said playback digital signal comprises:
supplying said playback clock signal to a phase locked loop, to extract a data clock signal component of said playback clock signal, as an output signal from said phase locked loop; and
frequency multiplying said output signal, to obtain a sampling clock signal, and
using said sampling clock signal to define said sampling period.

8. A method of designing a waveform equalizer according to claim 1, wherein said step of periodically sampling said playback digital signal to obtain successive digital sample values comprises the step of obtaining sequential combinations of values, as combinations of a plurality of successive ones of said digital sample values, and storing said combinations of values as said learning input values in said second memory means.

9. A method of designing a waveform equalizer according to claim 8 wherein said step of obtaining sequential combinations of values comprises deriving sequential interpolated values by interpolation between two successive ones of said digital sample values.

10. A waveform equalizer for processing an input distorted digital signal, comprising:
delay means coupled to receive said input distorted digital signal, for delaying said distorted digital signal by successive fixed amounts to obtain a plurality of delayed distorted digital signals; and
a plurality of neuron units, and a plurality of linking elements having respectively fixed weighting coefficients, said linking elements interconnecting said neuron units to form a neural network which is coupled to receive said input distorted digital signal and delayed distorted digital signals as input signals thereto, and which produces a waveform-equalized output digital signal in response to said input signals;
wherein each of said neuron units comprises a pair of series-connected signal inverting elements, and wherein of a plurality of weighted input signals supplied to said each neuron unit, each of said weighted input signals is selectively supplied to a first one or a second one of said inverting elements in accordance with whether an effectively positive or effectively negative value of weighting coefficient is to be applied to said each input signal.

* * * * *